(12) United States Patent
Lam et al.

(10) Patent No.: US 7,679,893 B2
(45) Date of Patent: Mar. 16, 2010

(54) DISPLAY HOUSING FOR COMPUTING DEVICE

(75) Inventors: Lawrence Lam, San Jose, CA (US); Jory Bell, San Francisco, CA (US); Chris J. Stringer, Pacifica, CA (US); Roy Riccomini, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 11/198,820

(22) Filed: Aug. 4, 2005

(65) Prior Publication Data

US 2005/0270244 A1 Dec. 8, 2005

Related U.S. Application Data

(62) Division of application No. 09/389,915, filed on Sep. 3, 1999, now Pat. No. 6,977,808.

(60) Provisional application No. 60/134,082, filed on May 14, 1999, provisional application No. 60/134,084, filed on May 14, 1999.

(51) Int. Cl.
*H05K 5/00* (2006.01)
*A47B 81/00* (2006.01)
*H04M 1/00* (2006.01)
*H01Q 1/42* (2006.01)

(52) U.S. Cl. .............. 361/679.26; 361/679.21; 361/679.55; 361/679.27; 312/223.2; 343/872; 455/575.7

(58) Field of Classification Search .......... 361/683, 361/683 IOR, 679.21, 679.26–679.27, 679.55; 343/872, 702; 312/223.2; 455/575.7
See application file for complete search history.

(56) References Cited

U.S. PATENT DOCUMENTS 3,777,222 A 12/1973 Harris (Continued)

FOREIGN PATENT DOCUMENTS

DE 10137919 6/2002

(Continued)

OTHER PUBLICATIONS

Apple Computer ibook hardware, General Topics; iBook Ports and Connectors, figs. 1 and 2.

(Continued)

*Primary Examiner*—Jayprakash N Gandhi
*Assistant Examiner*—Bradley H Thomas
(74) *Attorney, Agent, or Firm*—Beyer Law Group LLP

(57) ABSTRACT

An improved housing for a computing device is disclosed. The improved housing can have one or more of the following aspects. A first aspect of the invention pertains to a computer housing having a logo or other symbol that can be illuminated using light from the backside of a display panel. A second aspect of the invention pertains to a suspended frame that is able to support a display panel within a display housing. A third aspect of the invention pertains to a computing device provided with an internal antenna. A fourth aspect of the invention pertains to a stiffener for a computer housing so as to increase the rigidity and strength of the computer housing. A fifth aspect of the invention pertains to a housing having a logo, symbol or other device that can be illuminated using light from the backside of a display panel. A sixth aspect of the invention pertains to a lid for a computing device, such as a portable computer, that is provided with a translucent housing.

27 Claims, 15 Drawing Sheets

U.S. PATENT DOCUMENTS

| | | | |
|---|---|---|---|
| 4,277,665 A | | 7/1981 | Kondo et al. |
| 4,435,713 A * | | 3/1984 | Gasparaitis et al. ......... 343/702 |
| 4,584,585 A * | | 4/1986 | Marko et al. ................ 343/702 |
| 4,789,774 A | | 12/1988 | Koch et al. |
| 4,845,481 A | | 7/1989 | Havel |
| 4,847,736 A | | 7/1989 | Ho |
| 4,980,694 A * | | 12/1990 | Hines ......................... 343/702 |
| 5,008,870 A | | 4/1991 | Vessa |
| 5,072,230 A * | | 12/1991 | Taniyoshi et al. ............ 343/715 |
| 5,138,328 A * | | 8/1992 | Zibrik et al. ................ 343/702 |
| 5,222,076 A | | 6/1993 | Ng et al. |
| 5,228,562 A | | 7/1993 | Burk |
| 5,305,013 A | | 4/1994 | Daniels |
| D348,905 S | | 7/1994 | Smid |
| 5,339,213 A | | 8/1994 | O'Callaghan |
| 5,373,300 A * | | 12/1994 | Jenness et al. .............. 343/702 |
| 5,387,901 A | | 2/1995 | Hardt |
| 5,388,357 A | | 2/1995 | Malita |
| 5,406,729 A | | 4/1995 | Bejin |
| 5,422,751 A | | 6/1995 | Lewis et al. |
| 5,440,449 A * | | 8/1995 | Scheer ........................ 361/686 |
| 5,450,221 A | | 9/1995 | Owen et al. |
| 5,479,285 A | | 12/1995 | Burke |
| 5,490,647 A | | 2/1996 | Rice |
| 5,515,244 A | | 5/1996 | Levins et al. |
| 5,557,288 A * | | 9/1996 | Kato et al. ................... 343/702 |
| 5,615,945 A | | 4/1997 | Tseng |
| 5,640,689 A * | | 6/1997 | Rossi ....................... 455/575.7 |
| 5,644,320 A | | 7/1997 | Rossi |
| 5,666,261 A * | | 9/1997 | Aguilera ..................... 361/681 |
| 5,668,565 A * | | 9/1997 | Robinson .................... 343/895 |
| 5,677,698 A * | | 10/1997 | Snowdon ..................... 343/770 |
| 5,684,672 A * | | 11/1997 | Karidis et al. ............... 361/683 |
| 5,689,400 A | | 11/1997 | Ohgami et al. |
| 5,706,168 A | | 1/1998 | Erler et al. |
| 5,715,139 A | | 2/1998 | Nakajima |
| 5,738,536 A | | 4/1998 | Ohgami et al. |
| 5,742,120 A | | 4/1998 | Lin |
| 5,748,084 A * | | 5/1998 | Isikoff ..................... 340/568.1 |
| 5,774,098 A | | 6/1998 | Kawashima et al. |
| 5,777,704 A | | 7/1998 | Selker |
| 5,781,406 A | | 7/1998 | Hunte |
| 5,825,351 A | | 10/1998 | Tam |
| 5,828,341 A * | | 10/1998 | Delamater ................... 343/702 |
| 5,867,131 A | | 2/1999 | Camp, Jr. et al. |
| 5,870,282 A * | | 2/1999 | Andre et al. ................ 361/683 |
| 5,909,194 A * | | 6/1999 | Umeda et al. ............... 343/702 |
| 5,914,709 A | | 6/1999 | Graham et al. |
| 5,918,396 A * | | 7/1999 | Jung ........................... 40/546 |
| 5,920,310 A | | 7/1999 | Faggin et al. |
| 5,926,149 A * | | 7/1999 | Rummeli et al. ............. 343/791 |
| 5,929,813 A * | | 7/1999 | Eggleston ............ 343/700 MS |
| 5,936,587 A * | | 8/1999 | Gudilev et al. .............. 343/752 |
| 5,938,772 A | | 8/1999 | Welch |
| 5,963,421 A | | 10/1999 | Moss et al. |
| 5,966,098 A * | | 10/1999 | Qi et al. ...................... 343/702 |
| 5,966,284 A | | 10/1999 | Youn et al. |
| 6,016,038 A | | 1/2000 | Mueller et al. |
| 6,018,332 A | | 1/2000 | Nason et al. |
| 6,030,088 A | | 2/2000 | Scheinberg |
| 6,031,497 A * | | 2/2000 | Nam ......................... 343/702 |
| 6,035,180 A | | 3/2000 | Kubes et al. |
| 6,037,679 A | | 3/2000 | Pirillo |
| 6,058,634 A | | 5/2000 | McSpiritt |
| 6,061,037 A * | | 5/2000 | Brouwers et al. ........... 343/895 |
| 6,089,893 A | | 7/2000 | Yu et al. |
| 6,096,984 A | | 8/2000 | Howell et al. |
| 6,109,760 A | | 8/2000 | Salatrik et al. |
| 6,115,762 A | | 9/2000 | Bell et al. |
| 6,129,440 A | | 10/2000 | Reynolds |
| 6,144,552 A | | 11/2000 | Whitcher et al. |
| 6,150,774 A | | 11/2000 | Mueller et al. |
| 6,161,944 A | | 12/2000 | Leman |
| 6,166,496 A | | 12/2000 | Lys et al. |
| 6,167,312 A * | | 12/2000 | Goedeke ...................... 607/60 |
| 6,169,582 B1 * | | 1/2001 | Lee ............................ 348/552 |
| 6,190,017 B1 | | 2/2001 | Lai |
| 6,211,626 B1 | | 4/2001 | Lys et al. |
| 6,217,182 B1 | | 4/2001 | Shepherd et al. |
| 6,224,244 B1 | | 5/2001 | Burys |
| 6,259,417 B1 * | | 7/2001 | Kim et al. ................... 343/841 |
| 6,285,420 B1 | | 9/2001 | Mizumo et al. |
| 6,289,466 B1 | | 9/2001 | Bayramoglu et al. |
| 6,292,901 B1 | | 9/2001 | Lys et al. |
| 6,320,941 B1 | | 11/2001 | Tyroler |
| 6,340,868 B1 | | 1/2002 | Lys et al. |
| 6,357,887 B1 | | 3/2002 | Novak |
| 6,370,376 B1 * | | 4/2002 | Sheath ..................... 455/556.1 |
| D457,667 S | | 5/2002 | Piepgras et al. |
| D457,669 S | | 5/2002 | Piepgras et al. |
| D457,974 S | | 5/2002 | Piepgras et al. |
| 6,388,627 B1 * | | 5/2002 | Masaki et al. ............... 343/702 |
| D458,395 S | | 6/2002 | Piepgras et al. |
| D463,610 S | | 9/2002 | Piepgras et al. |
| 6,459,919 B1 | | 10/2002 | Lys et al. |
| 6,476,726 B1 | | 11/2002 | Pederson |
| 6,486,873 B1 | | 11/2002 | McDonough et al. |
| D468,035 S | | 12/2002 | Blanc et al. |
| 6,492,908 B1 | | 12/2002 | Cheng |
| 6,494,429 B2 | | 12/2002 | Tajima |
| 6,494,593 B2 | | 12/2002 | An et al. |
| 6,507,338 B1 | | 1/2003 | Liao et al. |
| 6,528,954 B1 | | 3/2003 | Lys et al. |
| 6,532,152 B1 * | | 3/2003 | White et al. ................ 361/692 |
| 6,535,718 B2 * | | 3/2003 | Harano ..................... 455/90.3 |
| 6,548,967 B1 | | 4/2003 | Dowling et al. |
| 6,577,080 B2 | | 6/2003 | Lys et al. |
| 6,600,662 B1 * | | 7/2003 | Emmert et al. .............. 361/814 |
| 6,608,453 B2 | | 8/2003 | Morgan et al. |
| 6,608,996 B1 | | 8/2003 | Laurikka et al. |
| 6,624,597 B2 | | 9/2003 | Dowling et al. |
| 6,652,128 B2 | | 11/2003 | Misaras |
| 6,690,362 B1 | | 2/2004 | Motoyama et al. |
| 6,720,745 B2 | | 4/2004 | Lys et al. |
| 6,809,690 B2 * | | 10/2004 | Tao ............................ 343/702 |
| 6,816,149 B1 | | 11/2004 | Alsleben |
| 6,867,738 B2 * | | 3/2005 | Birnbaum et al. ........... 343/702 |
| 6,888,322 B2 | | 5/2005 | Dowling et al. |
| 6,933,929 B1 | | 8/2005 | Novak |
| 6,977,808 B2 | | 12/2005 | Lam et al. |
| 6,992,733 B1 * | | 1/2006 | Klein .......................... 349/58 |
| 7,113,196 B2 | | 9/2006 | Kerr |
| 7,148,875 B2 | | 12/2006 | Rosenberg et al. |
| 7,239,503 B2 | | 7/2007 | Chen |
| 7,248,239 B2 | | 7/2007 | Dowling et al. |
| 7,452,098 B2 | | 11/2008 | Kerr |
| 2002/0113555 A1 | | 8/2002 | Lys et al. |
| 2002/0190975 A1 | | 12/2002 | Kerr |
| 2003/0002246 A1 | | 1/2003 | Kerr |
| 2003/0057884 A1 | | 3/2003 | Dowling et al. |
| 2003/0161093 A1 | | 8/2003 | Lam et al. |
| 2004/0141321 A1 | | 7/2004 | Dowling et al. |
| 2004/0201573 A1 | | 10/2004 | Yu et al. |
| 2005/0036300 A1 | | 2/2005 | Dowling et al. |
| 2005/0047132 A1 | | 3/2005 | Dowling et al. |

FOREIGN PATENT DOCUMENTS

| | | |
|---|---|---|
| EP | 0564127 | 6/1993 |
| JP | 10-105313 | 4/1998 |
| JP | 2001147739 | 5/2001 |
| WO | 00/28510 | 5/2000 |
| WO | 02/10847 | 2/2002 |
| WO | WO 02/103503 | 12/2002 |

| | | |
|---|---|---|
| WO | WO 02/103504 | 12/2002 |

OTHER PUBLICATIONS

Mahn et al., "HP-PAC: A New Chassis and Housing Concept for Electronic Equipment", Aug. 1994, Hewlett-Packard Journal.
Outpost.com advertisement for "Blue Cold Cathode Tube Light," downloaded Jul. 25, 2003.
website www.colorkinetics.com/products/controllers/index.htm, "Controllers feel the power. it's Herculean", downloaded Apr. 17, 2001.
website www.colorkinetics.com/products/lights/icolor/index.htm, "iColor Series iWant. iNeed. iHave to have", downloaded Apr. 17, 2001.
website www.cksauce.com/products/lightwand.htm, "LightWand" downloaded Jan. 28, 2002.
website www.cksauce.com/products/minilightwand.htm, "MiniLightWand" downloaded Jan. 28, 2002.
website www.cksauce.com/products/lightwasher.htm, "LightWasher" downloaded Jan. 28, 2002.
website www.cksauce.com/products/lightorb.htm, "LightOrb" downloaded Jan. 28, 2002.
"ibook: How to Determine Battery Charge Status," Article ID 58417, Apple Care Tech Infor Library, Aug. 25, 1999.
website www.cksauce.com/products/lightsprite.htm, "LightSprite" downloaded Jan. 28, 2002.
website www.cksauce.com/products/lightsaucer.htm, "LightSaucer" downloaded Jan. 28, 2002.
website www.jtech.com/products/guest_alert.htm, "GuestAlert Guest Paging Systems," downloaded Jan. 28, 2002.
website www.2.consumer.philips.com/global/b2c/ce/catalog/product.jhtml?divId=0&groupID=TV, downloaded Jan. 28, 2002.
Lam et al., "Display housing for computing device," U.S. Appl. No. 09/389,915, filed Sep. 3, 1999.
Circuit City advertisement for Philips Somba 13 stereo TV.
Search Report for PCT Application No. PCT/US2004/043479 dated Oct. 4, 2005 (APL1P215X1WO).
Written Opinion for PCT Application No. PCT/US2004/043479 dated Oct. 4, 2005 (APL1P215X1WO).
Written Opinion for corresponding PCT Application No. PCT/US02/18953 dated Jul. 28, 3005 (APL1P215WO).
Examination Report in corresponding Australian Patent No. 2002315170 dated Aug. 28, 2006 (APL1P218C1AU).
Office Action in corresponding U.S. Appl. No. 11/198,783 dated Aug. 17, 2007.
Office Action dated Aug. 23, 2007 from U.S. Appl. No. 10/075,964.
Office Action dated Sep. 12, 2007 from U.S. Appl. No. 11/486,272.
Office Action dated Apr. 30, 2008 from U.S. Appl. No. 10/773,897.
Written Opinion dated Jan. 23, 2008 from International Application No. PCT/US02/18953.
Office Action dated Dec. 19, 2007 in U.S. Appl. No. 11/198,817.
Office Action dated Dec. 12, 2007 in U.S. Appl. No. 10/773,897.
Office Action dated Jan. 28, 2008 in U.S. Appl. No. 11/198,783.
Office Action dated Jan. 28, 2008 in U.S. Appl. No. 10/075,964.
Office Action dated Nov. 30, 2007 in Chinese Patent Application No. 200480042692.0.
Office Action dated Mar. 3, 2008 in U.S. Appl. No. 11/169,608.
Office Action dated Aug. 15, 2008 in Canadian Patent Application No. 2,447,545.
Office Action dated Aug. 19, 2008 in Canadian Patent Application No. 2,447,152.
Notice of Allowance dated Jul. 30, 2008 in U.S. Appl. No. 10/075,964.
Notice of Allowance dated Aug. 13, 2008 in U.S. Appl. No. 11/198,817.
Final Office Action dated Nov. 19, 2008 in U.S. Appl. No. 11/486,272.
Office Action dated Nov. 13, 2008 in U.S. Appl. No. 10/773,897.
Office Action dated Jun. 26, 2009 in U.S. Appl. No. 12/249,764.
Notice of Allowance dated Jun. 11, 2009 in U.S. Appl. No. 10/012,751.
Office Action dated Jun. 3, 2009 in U.S. Appl. No. 12/211,698.
Office Action dated Apr. 20, 2009 in U.S. Appl. No. 11/486,272.
Office Action dated Feb. 24, 2009 in U.S. Appl. No. 10/773,897.
Office Action dated Sep. 10, 2009 in U.S. Appl. No. 10/773,897.
Office Action dated Jul. 16, 2009 in EP Application No. 02 742 114.8.
Office Action dated Sep. 30, 2009 in U.S. Appl. No. 11/486,272.
Office Action dated Oct. 28, 2009 in U.S. Appl. No. 12/211,698.

* cited by examiner

US 7,679,893 B2

DISPLAY HOUSING FOR COMPUTING DEVICE

CROSS-REFERENCE TO RELATED APPLICATIONS

This application is a divisional of U.S. application Ser. No. 09/389,915, filed Sep. 3, 1999 and entitled "DISPLAY HOUSING FOR COMPUTING DEVICE," which claims priority to U.S. Provisional Application No. 60/134,082, filed May 14, 1999 and entitled "DISPLAY HOUSING FOR COMPUTING DEVICE," both of which are hereby incorporated herein by reference.

This application is also related to U.S. Application No. 60/134,084, filed May 14, 1999 and entitled "HOUSING FOR A COMPUTER DEVICE," which is hereby incorporated herein by reference.

BACKGROUND OF THE INVENTION

1. Field of the Invention

The present invention relates generally to computer system and, more particularly, to improved features for housings of computer systems.

2. Description of the Related Art

All computing devices, including portable computers and desktop computers, have housings that enclose the components and circuitry of the computing devices. Various design difficulties are presented as these housing get more compact. These design difficulties are particularly acute for portable computers where a lot of components are required to fit in small areas. The difficulties are increased when the housings include complex shapes and decorative features.

Thus, there is a need for improved housings for computing devices.

SUMMARY OF THE INVENTION

Broadly speaking, the invention relates to an improved housing for a computing device. The improved housing can have one or more of the following aspects. A first aspect of the invention pertains to a computer housing having a logo or other symbol that can be illuminated using light from the backside of a display panel. A second aspect of the invention pertains to a suspended frame that is able to support a display panel within a display housing. A third aspect of the invention pertains to a computing device provided with an internal antenna. A fourth aspect of the invention pertains to a stiffener for a computer housing so as to increase the rigidity and strength of the computer housing. A fifth aspect of the invention pertains to illumination of design elements or features using light from the backside of a display panel. A sixth aspect of the invention pertains to a lid for a computing device, such as a portable computer, that is provided with a translucent housing.

The invention can be implemented in numerous ways, including as an apparatus, a device, a method, and a computer system. Several embodiments of the invention are discussed below.

As a display apparatus, one embodiment of the invention includes: a light panel that produces light for a display screen; a frame supporting said light panel with dimensional stability; a housing having said frame attached thereto, substantial portions of said housing being translucent; and a cosmetic shield provided between said housing and said frame to mask said frame and said light panel from being visible through the substantial portions of said housing being translucent.

As a display apparatus, another embodiment of the invention includes: a housing, substantial portions of said housing being translucent; a light panel provided within said housing, said light panel produces light for a display screen; and a cosmetic shield provided between said housing and said light panel to mask said light panel from being visible through the substantial portions of said housing being translucent.

As a method for illuminating a predetermined design in a translucent housing using reflected light, one embodiment of the invention includes: emitting light from a light panel in first and second directions; reflecting a portion of the light emitted in the second direction from a cosmetic shield, the cosmetic shield being provided between the housing and the light panel; reflecting a portion of the light reflected from the cosmetic shield back towards the cosmetic shield using a reflecting surface; and passing a portion of the reflected light from the reflecting surface through an opening in the cosmetic shield having the predetermined design and then through a corresponding portion of the housing adjacent the opening in the cosmetic shield, thereby illuminating the predetermined design in the translucent housing.

As a portable computer, one embodiment of the invention includes: a hinge; and a housing having a display portion and a base portion, the display portion being attached to the base portion with said hinge, wherein the base portion includes at least a processor, and wherein the display portion includes at least a flat panel display, an outer shell, and a frame supporting said flat panel display with respect to said portable computer by way of said hinge.

As a display apparatus, one embodiment of the invention includes: a flat panel display that emits light in a forward direction and in a back direction when active; and an outer shell for providing a housing for at least a rear portion of said display apparatus, said outer shell including a transparent portion through which a portion of the light emitted by said flat panel display in the back direction is able to pass, thereby illuminating the transparent portion when said flat panel display is active.

As a housing for a computer device, one embodiment of the invention includes: a front shell; a back shell coupled to said front shell to produce said housing, electrical components for the computer device being internal to said housing; and a foam stiffener provided internal to said housing to substantially fill unused space internal to said housing, thereby providing stiffness to said housing.

As a stiffening system for providing distributed loading to a portable computer assembly, one embodiment of the invention includes: a computer housing, said computer housing including a first member and a second member, said second member being coupled to said first member to form a volume therebetween and wherein said first member and said second member when coupled together form said computer housing; a stiffener, said stiffener being disposed between said first member and said second member of said computer housing, said stiffener being configured to substantially fill an unused portion of the volume between said first member and said second member wherein the outer surfaces of said stiffener respectively conform to the inner surfaces of the first and second member.

As a computer system, one embodiment of the invention includes: an antenna, said antenna being configured to transmit or receive RF signals; and a computer housing, said computer housing being configured to enclose said antenna such that said antenna is entirely contained internal to said computer housing and is operable while being internal to said computer housing without having to extend any portion of said antenna outside said computer housing.

As an antenna device for transmitting and receiving RF for use by a computer, one embodiment of the invention includes: an antenna cable having first and second conductors; an outer conductor, said outer conductor being operatively coupled to said second conductor of said antenna cable; an inner conductor, said inner conductor being operatively coupled to said first conductor of said antenna cable; and an antenna housing, said antenna housing being disposed around the outer periphery of said outer conductor and said inner conductor, and wherein said antenna housing maintains a fixed separation between said outer conductor and said antenna cable.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The invention pertains to an improved housing for a computing device. More particularly, a first aspect of the invention pertains to a computer housing having a logo or other symbol that can be illuminated using light from the backside of a display panel. A second aspect of the invention pertains to a suspended frame is able to support a display panel within a display housing. A third aspect of the invention pertains to a computing device provided with an internal antenna. A fourth aspect of the invention pertains to a stiffener for a computer housing so as to increase the rigidity and strength of the computer housing. A fifth aspect of the invention pertains to illumination of design elements or features using light from the backside of a display panel. A sixth aspect of the invention pertains to a lid for a computing device, such as a portable computer, that is provided with a translucent housing.

Embodiments of the invention are discussed below with reference to FIGS. 1-14D. However, those skilled in the art will readily appreciate that the detailed description given herein with respect to these figures is for explanatory purposes as the invention extends beyond these limited embodiments.

Figure 1:
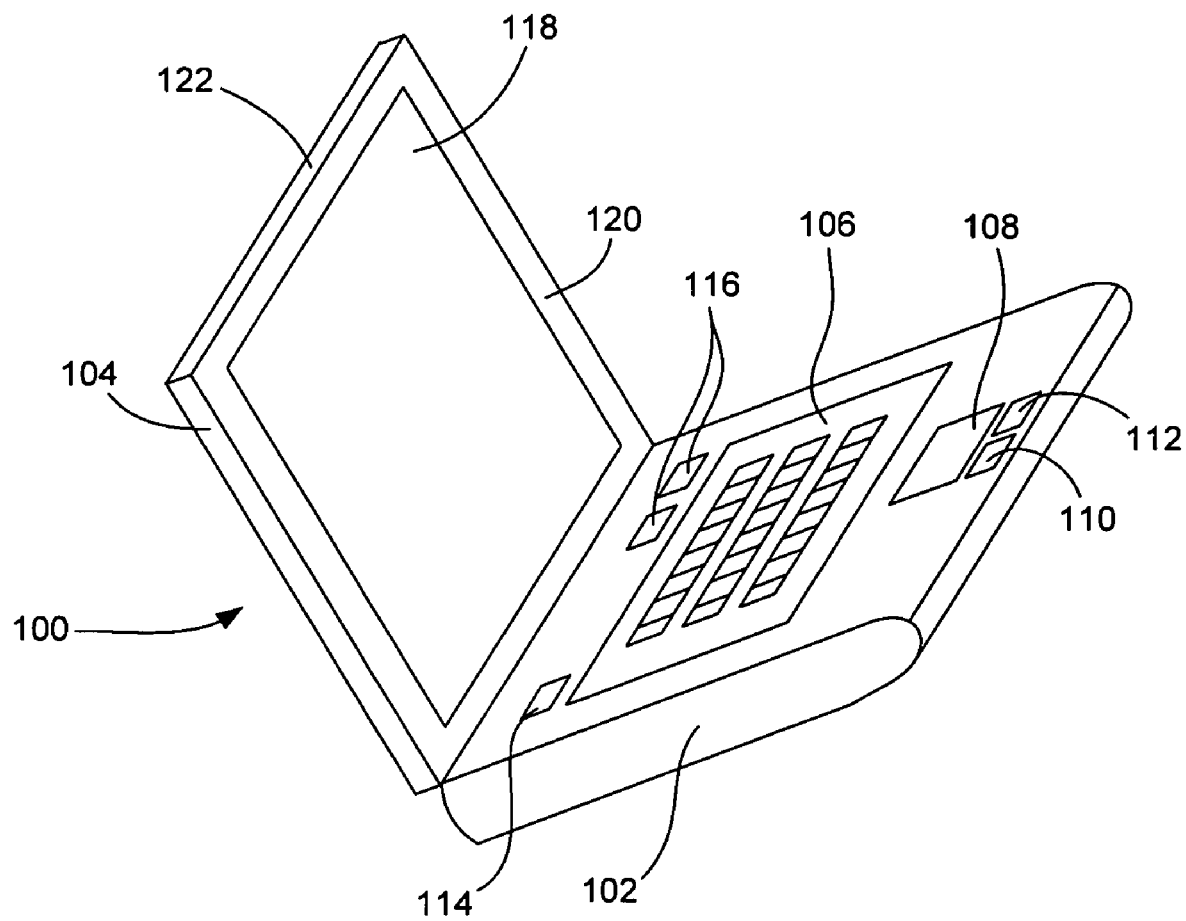
FIG. 1 is a perspective diagram of a portable computer.

FIG. 1 is a perspective diagram of a portable computer 100. The portable computer 100 includes a base 102 and a lid 104. The base 102 houses internally various integrated circuit chips and other circuitry to provide computing operations for the portable computer 100. The integrated circuit chips and other circuitry include a microprocessor, Read-Only Memory (ROM), Random-Access Memory (RAM), a disk drive, a battery, and various input/output (I/O) support circuitry. The base 102 also includes a keyboard 106 that allows a user of the portable computer 100 to enter alphanumeric data. The base 102 also includes a track pad 108 and associated buttons 110 and 112. The track pad 108 is an input device for the portable computer 100 and generally represents an input pointer device. The associated buttons 110 and 112 allow a user to make a selection with respect to a graphical user interface. Additionally, the base 102 includes a power switch 114 and miscellaneous switches 116.

The lid 104 is coupled to the base 102 by way of a hinge mechanism (not shown). As such, the lid 104 can rotate into an open position or a closed position with respect to the base 102. As illustrated in FIG. 1, the lid 104 is in the open position. The lid 104 contains a light emitting diode (LCD) display 118. The LCD display 118 is visible to a user of the portable computer 100 when the lid 104 is in the open position, such as illustrated in FIG. 1. The LCD display 118 is surrounded at a peripheral region by a bezel 120 that serves to support the LCD display 118 in its assembled position within the lid 104. When the lid 104 is in a closed position, an outer surface 122 of the lid 104 is visible but the LCD display 118 and the bezel 120 are no longer visible to the user.

According to a first aspect of the invention, a logo or other symbol provided on a housing can be illuminated using light from the backside of a LCD panel. The light can be direct, reflected, or both. The illumination is provided by use of otherwise wasted light.

Figure 2:
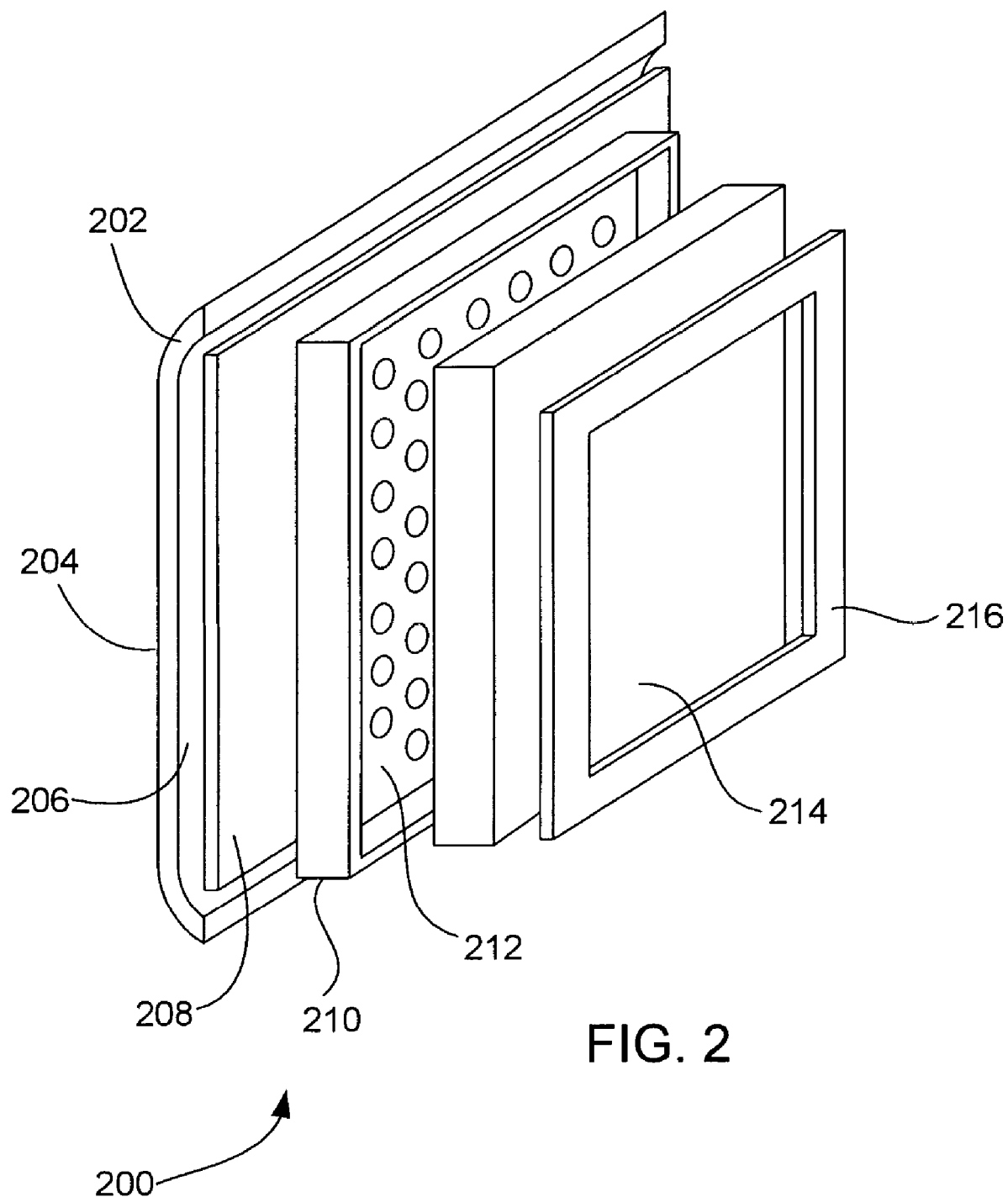
FIG. 2 illustrates a display apparatus according to one embodiment of the invention.

FIG. 2 illustrates a display apparatus 200 according to one embodiment of the invention. The display apparatus 200 illustrated in FIG. 2 represents an assembly diagram for the display apparatus 200.

The display apparatus 200 includes a translucent housing 202. The translucent housing 202 has an outer surface 204 and an inner surface 206. In one implementation, the translucent housing 202 is a lid of a portable computer, such as the lid 104 illustrated in FIG. 1. A cosmetic shield 208 is placed against the inner surface 206 of the translucent housing 202. The cosmetic shield 208 provides a uniform, clean look for the translucent housing 202 when viewed from the outer surface 204. In other words, the cosmetic shield 208 provides the uniform, clean look and masks out the undesirable appearance of other internal components to the display apparatus 200. A suspended frame 210 is connected to the translucent housing 202 at the inner surface 206. The suspended frame 210 typically affixes itself with respect to the translucent housing 202 at the periphery of the translucent housing 202. An EMI shield 212 can be placed within the suspended frame 210 or between the suspended frame 210 and the cosmetic shield 208. The EMI shield 212 is a metal sheet have a plurality of holes. A LCD panel 214 is affixed to the suspended frame 210. Hence, the suspended frame 210 operates to secure the position of the LCD panel 214 with respect to the translucent housing 202. The EMI shield 212 serves to block emissions from at least the back-side of the LCD panel 214. A bezel 216 provides a border around the edge of the front-side of the LCD panel 214 and typically attaches to a peripheral region of the translucent housing 202.

Figure 3A:
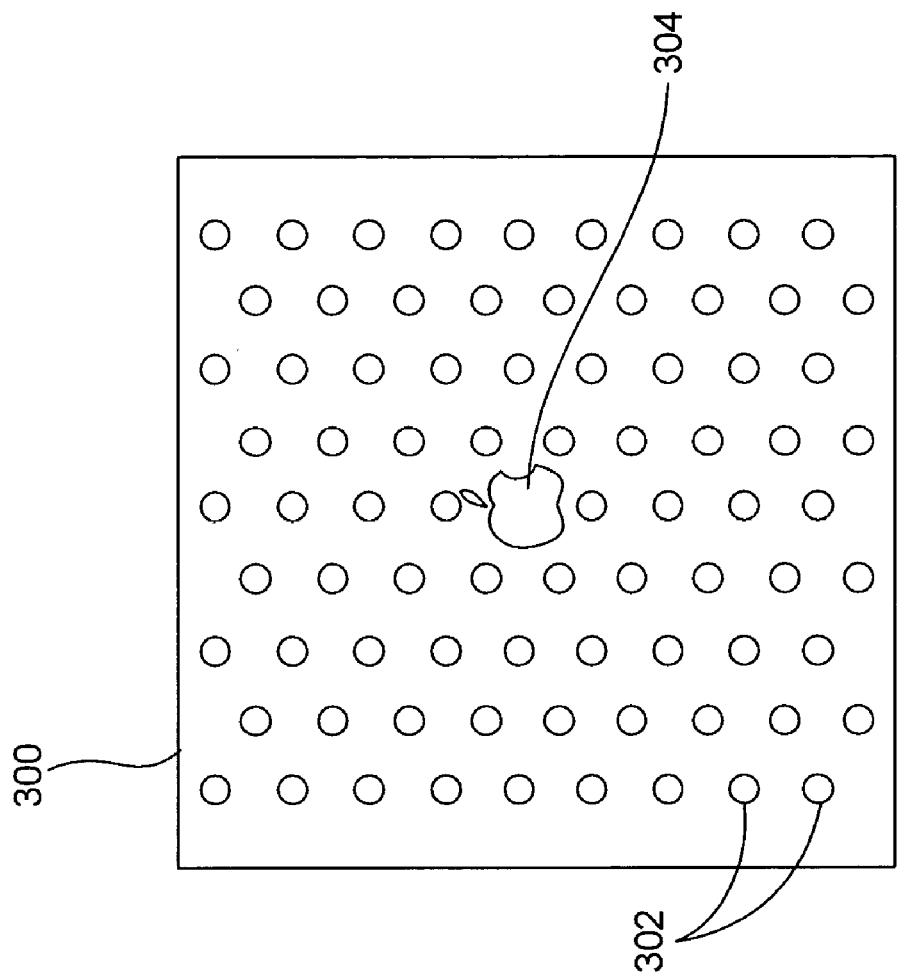
FIG. 3A is a diagram of an EMI shield according to one embodiment of the invention.

FIG. 3A is a diagram of an EMI shield 300 according to one embodiment of the invention. The EMI shield 300 represents an embodiment of the EMI shield 212 illustrated in FIG. 2. The EMI shield 300 includes a plurality of holes 302 which are typically provided in a predetermined pattern (e.g., grid pattern). Even though the EMI shield 300 includes a plurality of holes 302, when placed adjacent to one side of a LCD panel, the EMI shield is able to limit electromagnetic emissions from the display apparatus due to the back-side of the LCD panel. The EMI shield 300 also includes a solid region 304 through which there are no holes. In FIG. 3A, the solid region 304 is in the form of a symbol or a company logo, such as an apple which is the company logo of Apple Computer, Inc. In general, the solid region 304 provides a reflection area that is utilized to provide symbol illumination as discussed in detail below. However, it should be noted that the solid region 304 need not have the same shape or configuration as the symbol to be illuminated. For example, the solid region 304 illustrated in FIG. 3A could be a square region that is at least as large as the symbol to be illuminated.

Figure 3B:
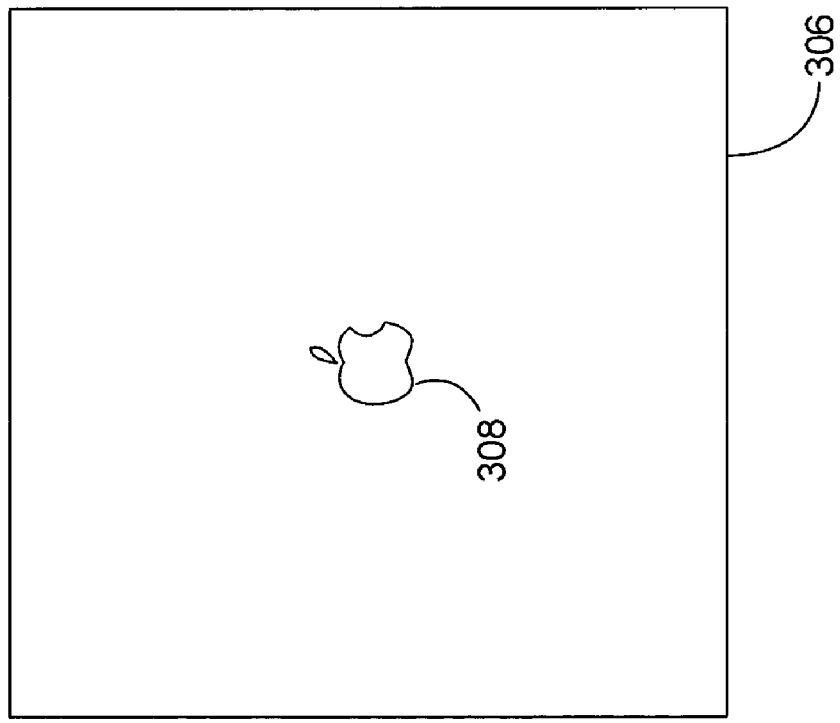
FIG. 3B is a diagram of a cosmetic shield according to one embodiment of the invention.

FIG. 3B is a diagram of a cosmetic shield 306 according to one embodiment of the invention. The cosmetic shield 306 can be formed from a variety of materials. For example, in one implementation, cosmetic shield 306 is a thin sheet of aluminum. Other suitable materials for the cosmetic shield 306 include, for example, paper or plastic. The cosmetic shield 306 can be any of a variety of different colors or multiple colors. Although the cosmetic shield 306 generally reflects light incident from the LCD panel, the cosmetic shield 306 also include an opening 308. The opening 308 corresponds to the symbol to be illuminated. The opening 308 provides an outlet for some of the light being reflected from the solid region 304 of the EMI shield 300 towards the cosmetic shield 306. Accordingly, the light passing through the opening 308 illuminates the logo or other symbol.

Figure 4:
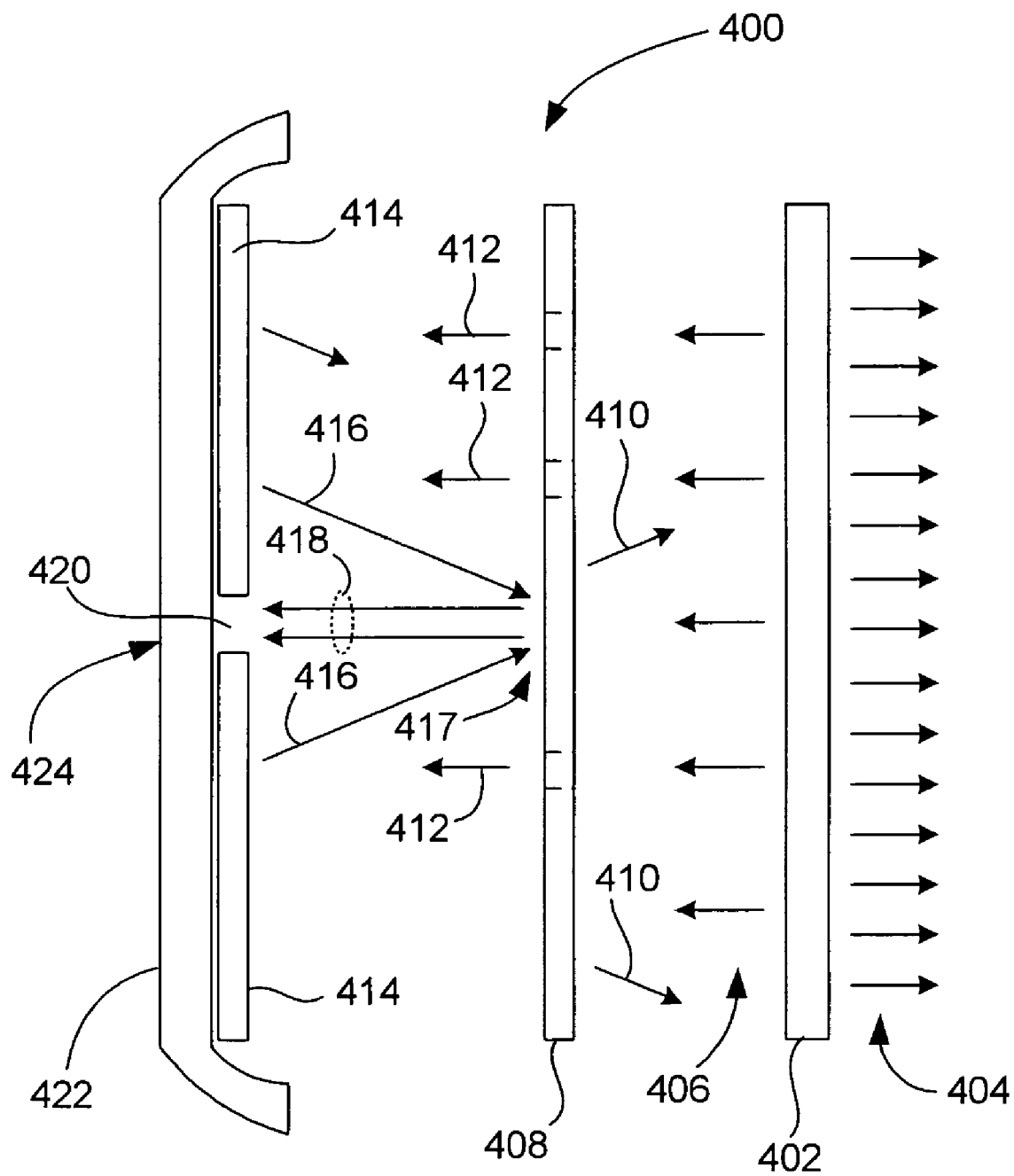
FIG. 4 is a diagram of a symbol illumination system according to one embodiment of the invention.

FIG. 4 is a diagram of a symbol illumination system 400 according to one embodiment of the invention. The symbol illumination system 400 operates to illuminate a symbol at a translucent portion of a housing using light provided by a display panel. The symbol illumination system 400 explains how a symbol is illuminated by a display apparatus, such as the display apparatus 200 illustrated in FIG. 2, according to one embodiment of the invention.

The symbol illumination system 400 includes a LCD panel 402. The LCD panel 402 emits light in a primary direction 404 as well as in a secondary direction 406. The primary direction 404 is associated with the direction towards a viewing side of the LCD panel 402. A user of the LCD panel 402 (or the computer to which the LCD panel 402 is associated) typically views a display screen from the viewing side of the LCD panel 402. The secondary direction 406 represents light being emitted from the back-side of the LCD panel 402 towards the housing which supports the LCD panel 402. Generally, the second direction 406 is opposite the primary direction. The light being emitted in the secondary direction 406 then interacts with an EMI shield 408. The EMI shield 408 includes a plurality of holes through which light may pass. As an example, the EMI shield 408 can be constructed such as the EMI shield 300 illustrated in FIG. 3A. In any case, when the light emitted in the secondary direction 406 strikes the EMI shield 408 at one of the respective holes within the EMI shield 408, then such light 412 can pass through the EMI shield 408. On the other hand, the light emitted in the secondary direction that does not strike the EMI shield 408 at a hole (but instead a solid region), such light 410 is reflected back toward the LCD panel 402.

The light 412 that does pass through the EMI shield 408 next impinges upon a cosmetic shield 414. The light 412 striking the cosmetic shield 414 is reflected from the cosmetic shield 414 back towards the EMI shield 408 as reflected light 416. Thereafter, a portion of the reflected light 416 that reflects back to a solid region 417 (e.g., solid region 304) of the EMI shield 408 is then again reflected back from the solid region 417 of the EMI shield 408 towards the cosmetic shield 414 as twice reflected light 418. At least a portion of the twice reflected light 418 is directed to an opening 420 in the cosmetic shield 414. The portion of the twice reflected light passing through the opening 420 then passes through a translucent housing 422 to produce an illuminated image 424 at an outer surface of the translucent housing 422. More particularly, the opening 420 within the cosmetic shield 414 is configured in accordance with an image of the symbol to be illuminated. For example, when the opening 420 is formed such as the opening 308 in the cosmetic shield 306 illustrated in FIG. 3B, the illuminated image 424 at the outer surface of the translucent housing 422 would correspond to an illuminated apple symbol. However, as noted above, any graphic or symbol can be illuminated in this manner.

Figure 5:
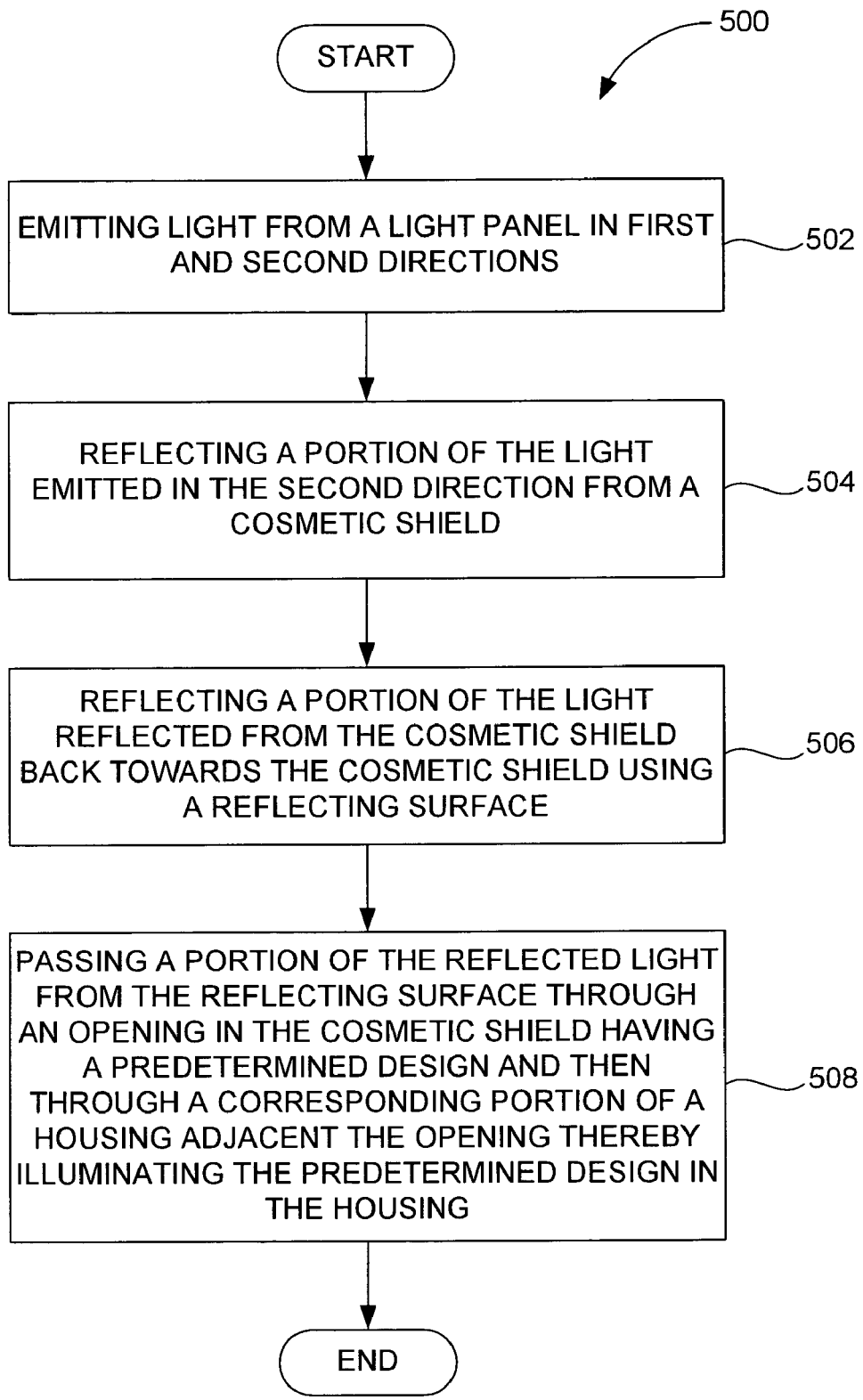
FIG. 5 is a flow diagram of design illumination processing according to one embodiment of the invention.
Figure 6:
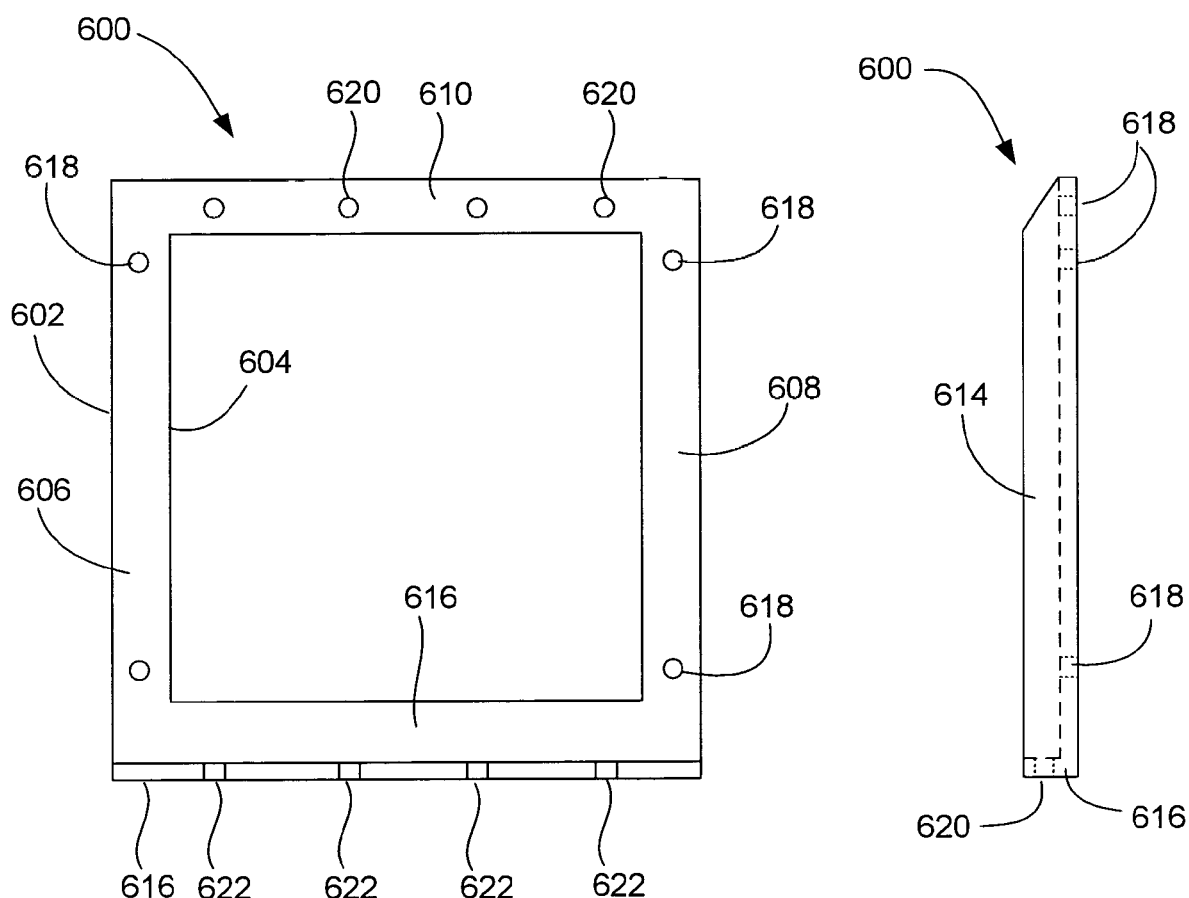
FIG. 6A is a top view of a suspended frame according to one embodiment of the invention.
FIG. 6B is a right side view of the suspended frame.

FIG. 5 is a flow diagram of design illumination processing 500 according to one embodiment of the invention. The design illumination processing 500 is, for example, performed by a symbol illumination system, such as the symbol illumination system 400 illustrated in FIG. 4. Typically, the symbol illumination system would be provided on an electronic device having a display panel for displaying information to a user. The design illumination processing 500 enables a design (e.g., symbol, logo or other graphic) on a back surface of a housing for the display panel of the electronic device to be illuminated using reflected light from the light panel.

The design illumination processing 500 begins by emitting 502 light from a light panel in first and second directions. Typically, the first direction is a primary direction in which light is emitted from the light panel, and the second direction is a secondary in which light is also emitted. Typically, the amount of light emitted in the second direction is substantially less than the amount of light emitted in the first direction. Often, the light emitted in the second direction is a side-effect not normally desired (i.e., a side-effect) but such light is utilized by the invention.

Next, a portion of the light emitted in the second direction from the light panel is reflected 504 from a cosmetic shield. In other words, the light emitted in the second direction is reflected back in substantially the first direction by the cosmetic shield. Typically, the cosmetic shield reflects most of the light striking its surface, but some of the light can also be absorbed.

Then, a portion of the light reflected from the cosmetic shield is reflected 506 back towards the cosmetic shield using a reflecting surface. The reflecting surface can be provided in a number of ways, including as a reflecting material provided on a portion of a back surface of the light panel or an intermediate reflecting region provided between the cosmetic shield and the back surface of light panel. Examples of an intermediate reflecting region are the solid region 304 of the EMI shield 300 in FIG. 3A or the solid region 417 of the EMI shield 408 illustrated in FIG. 4.

Thereafter, a portion of the reflected light from the reflecting surface is passed 508 through an opening in the cosmetic shield having a predetermined design and then through a corresponding portion of an adjacent housing. In other words, light reflected from the cosmetic shield back to the reflecting surface then back again towards the cosmetic shield will eventually have a portion thereof pass through the opening in the cosmetic shield. The opening in the cosmetic shield leads to a housing that is adjacent to the cosmetic shield. Also, at least a portion of the housing adjacent the cosmetic shield is translucent. Consequently, the light passing through the opening in the cosmetic shield also then passes through a corresponding portion of the (translucent) housing that is adjacent to the opening in the cosmetic shield, thereby illuminating the predetermined design in the housing. Once the design is illuminated, the design illumination processing 500 is then complete and ends.

The design being illuminated is located adjacent the opening in the cosmetic shield. As noted above, the design can be provided in the translucent portion of the housing adjacent the opening in the cosmetic shield. The design could also be provided by a separate design piece of translucent material that is inserted and affixed within an opening in the (translucent or non-translucent) housing. In such case, the opening in the housing would be adjacent the opening in the cosmetic shield. Still further, a light pipe or light guide could direct the light to the design and thus not be adjacent the opening in the cosmetic shield.

According to a second aspect of the invention, a suspended frame is able to support a LCD panel within a display housing with attachments being made at upper and lower peripheral surfaces. The suspended frame is particularly well suited for use with a translucent display housing.

FIG. 6A is a top view of a suspended frame 600 according to one embodiment of the invention. FIG. 6B is a right side view of the suspended frame 600. The suspended frame 600 illustrated in FIG. 6A and FIG. 6B represents one embodiment for the suspended frame 210 illustrated in FIG. 2.

The suspended frame 600 includes an outer periphery 602 and an inner periphery 604 that form the frame. However, the suspended frame 600 could alternatively be a sheet which would provider greater support at the additional manufacturing cost and additional weight. Typically, the suspended frame 600 is a metal structure, such as sheet metal. The suspended frame 600 is used to support a LCD panel, such as the LCD panel 214 illustrated in FIG. 2. The suspended frame 600 includes a left side 606, a right side 608, a top side 610, and a bottom side 612. The left side 606 and the right side 608 have side edges 614 that extend outward at the outer periphery 602 of the left side 606 and the right side 608. Additionally, the bottom side 612 includes a bottom edge 616 that extends outward at the outer periphery 602 of the bottom side 612. In order to affix the LCD panel to the suspended frame 600, the suspended frame 600 includes holes 618 at the left side 606 and the right side 608. The top side 610 includes holes 620 and the bottom edge 616 includes holes 622. The holes 620 and 622 are used to affix or mount with respect to the suspended frame 600 as discussed below.

Figure 7:
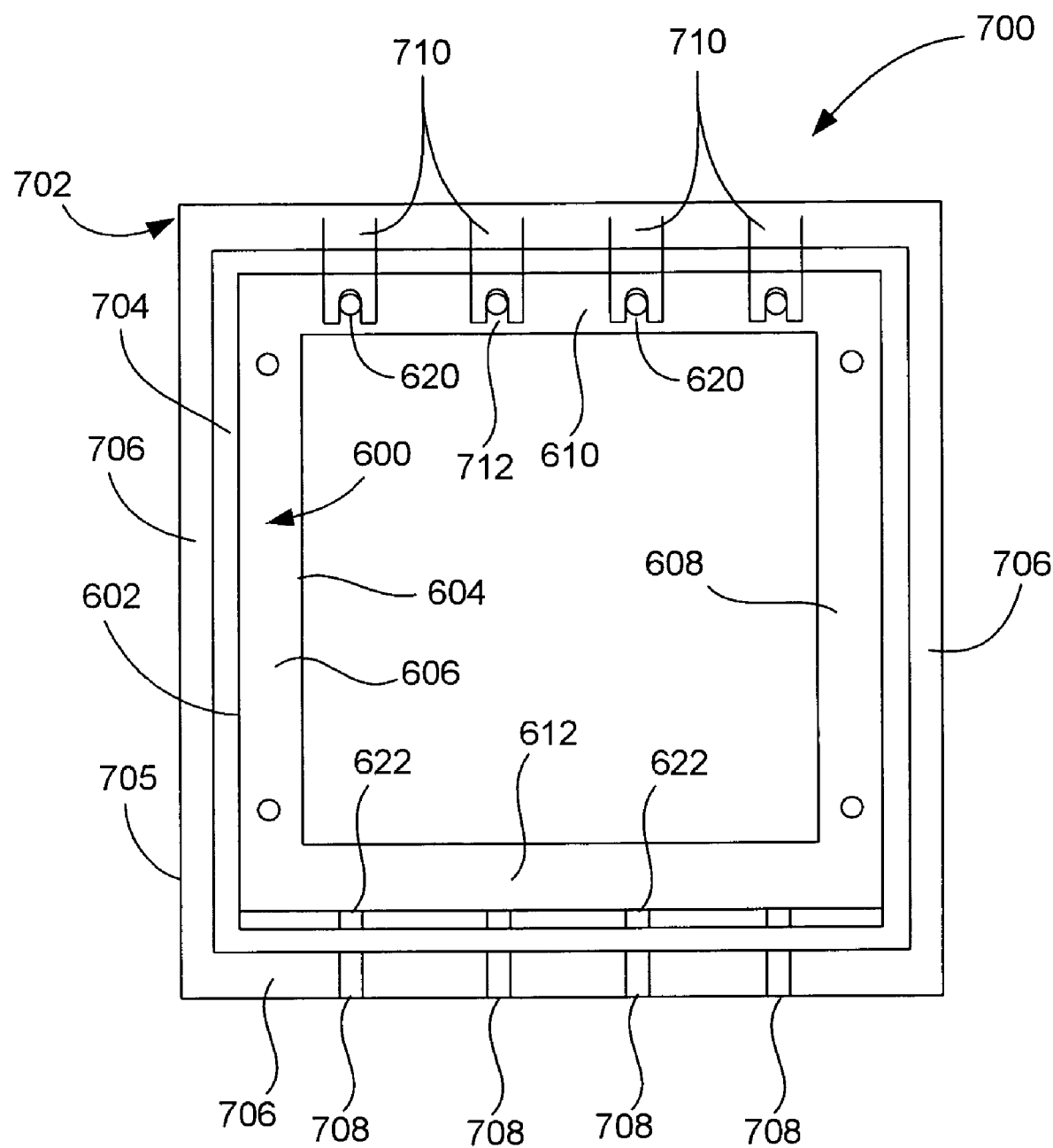
FIG. 7 is a view of a partial housing assembly according to one embodiment of the invention.

The suspended frame 600 then in turn mounts to a housing. For example, the housing can be the translucent housing (lid) 202 illustrated in FIG. 2. FIG. 7 is a view of a partial housing assembly 700 according to one embodiment of the invention. The partial housing assembly 700 illustrates the suspended frame 600 being affixed or attached to a housing 702. The housing 702 includes an inner surface 704 and an outer surface 705. At the periphery of the inner surface 704, an outer lip 706 is formed. The outer lip 706 typically extends around the periphery of the translucent housing 702. At a bottom side of the outer lip 706 a plurality of holes 708 are provided through the outer lip 706. The holes 708 through the bottom side of the outer lip 706 align with the holes 622 in the bottom edge 616 of the bottom side 612 of the suspended frame 600. By threading screws through the holes 708 and into the corresponding holes 622, the bottom side of the suspended frame 600 is affixed to the bottom side of the housing 702. The housing 702 also includes the plurality of tabs 710 at a top side of the housing 702. In one embodiment, the tabs 710 are constructed as part of the housing 702 and extend downward from the top side over the top side 610 of the suspended frame 600. The tabs 710 are used to affix or mount the top side 610 of the suspended frame 600 to the top side of the housing 702. Typically, screws would be threaded through openings 712 in the tabs 710 and through the corresponding holes 620 in the top side 610 of the suspended frame 600. It should be noted that in this embodiment, the suspended frame 600 is coupled to the housing 702 only at the top side and at the bottom side near the periphery. As such, when the housing 702 is translucent, the outer surface 705 of the translucent housing provides a smooth, uniform appearance (without having visual detractions due to large numbers of screws, etc.) even though the suspended frame 600, as well as the LCD panel coupled thereto, are securely fastened to the translucent housing.

Still further, the suspended frame 600 is connected to a base housing (e.g., base 102 of FIG. 1) through a hinge mechanism (not shown). The housing 702 then, as noted above, attaches to the suspended frame 600. The LCD display (e.g., 214) attaches to the suspended frame 600. A bezel (e.g., bezel 120) couples to the housing 702 or the suspended frame 600. Hence, when the lid (e.g., lid 104) is assembled, the bezel and the housing sandwiches the suspended frame 600 and the LCD display. Another advantage of the suspended frame 600 is then that the functional components within the lid are able to be easily serviced, tested or assembled because the bezel and housing can be removed while leaving the LCD display operable and attached to the suspended frame 600 (as well as the hinge mechanism).

According to a third aspect of the invention, a portable computing device is provided with an internal antenna. In one embodiment, the antenna is internal to a computer housing (e.g., LCD display housing).

Figure 8:
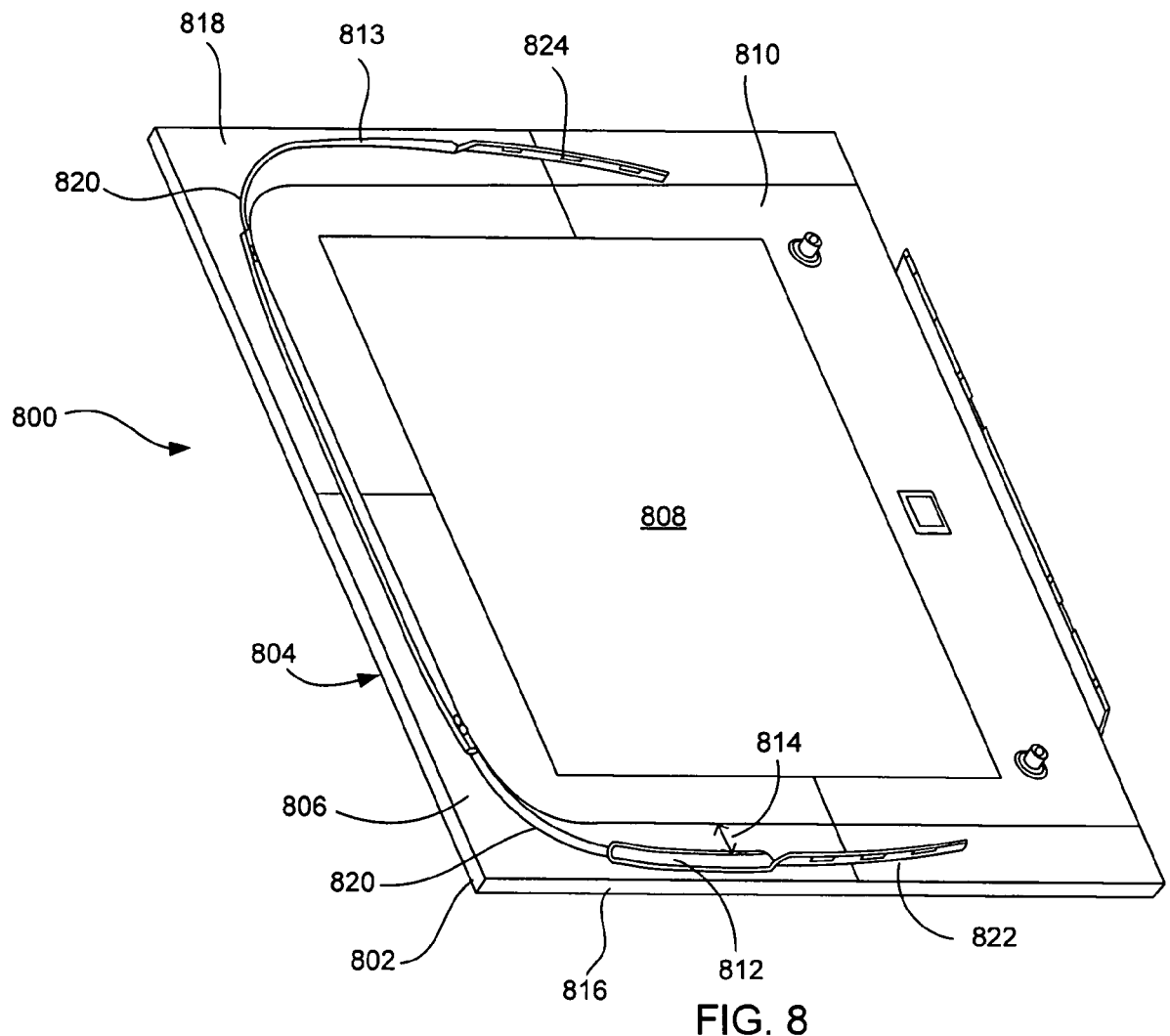
FIG. 8 is an internal view of a Liquid Crystal Display (LCD) display housing for a computer.

FIG. 8 is an internal view of a LCD display housing 800 for a computer. The LCD display housing 800 has a housing 802. The housing 802 has an outer surface 804 and an inner surface 806. Affixed to the inner surface of the housing 802 is a LCD display 808. The peripheral portion of the LCD display 808 and brackets used to affix the LCD display 808 to the inner surface 806 of the housing 802 can be cosmetically masked with a cosmetic frame 810. In one implementation, the cosmetic frame 810 is a thin sheet of aluminum. The cosmetic frame 810 is useful when the housing has translucent portions.

The housing 802 is also configured to enclose an antenna. The inner surface 806 of the housing 802 is also provided with recesses 812 and 813 for receiving the antenna. In one implementation, the recesses 812 and 813 are configured to coincide with the shape of the antenna device so that the assembly of the antenna device to the inner surface 806 of the housing 802 is performed with ease (and likely without any need to otherwise adhere or fasten). In most instances, the antenna device is disposed at the outer perimeter of the inner surface 806 of the housing 802. For RF interference reasons, it is desirable to place the antenna as far away from metal surfaces within the housing 802, namely, the LCD display 808 and the brackets used to affix the LCD display 808 to the inner surface of the housing 802. Also, when the cosmetic shield 810 is provided and made of metal, it is also desirable to place the antenna as far from the cosmetic shield as practicable. Given the space constraints of the LCD display housing 800, the housing 802 generally conforms to the shape and size of the LCD display 808. However, to provide a separation gap 814, the housing 802 is provided with sufficient area on sides 816 and 818. The recesses 812 and 813 are thus provided on the sides 816 and 818 spaced the separation gap 814 from the nearest interfering metal surfaces. In one implementation, the separation gap 814 is 12 mm, but such separation is dependent on the mass of metal in the LED display housing.

Figure 9:
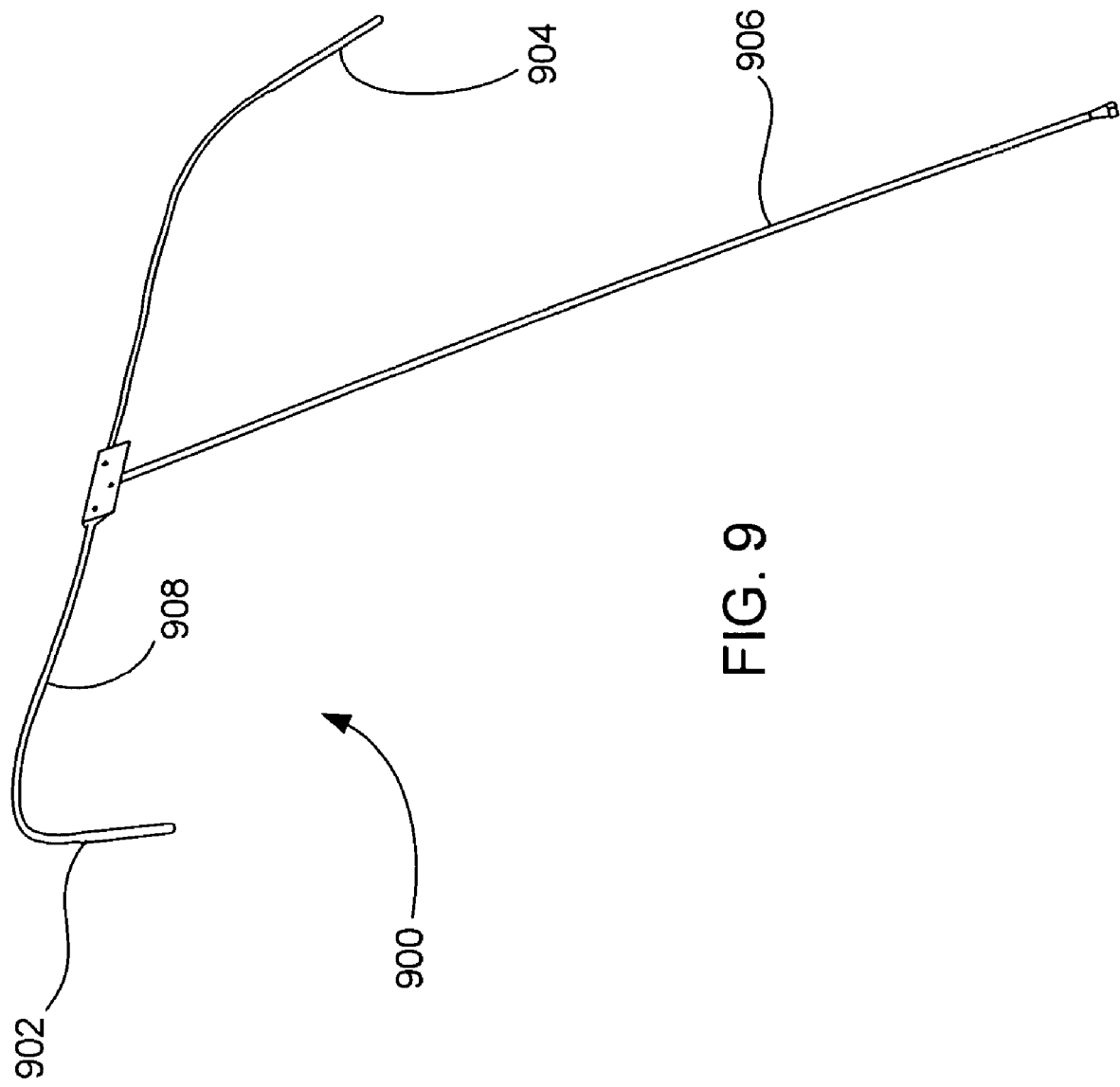
FIG. 9 is a diagram of an antenna according to one embodiment of the invention.

FIG. 9 is a diagram of an antenna 900 according to one embodiment of the invention. The antenna 900 has a first antenna pole 902 and a second antenna pole 904. Both the first antenna pole 902 and the second antenna pole 904 are connected to antenna cables 906 and 908. When the antenna 900 is attached to the housing 802, the first antenna pole 902 fits into the recess 812 and the second antenna pole 904 fits into the recess 813. The antenna cable 908 couples the first and second antenna poles 902 and 904 together. When the antenna 900 is attached to the housing 802, the antenna cable 908 fits into a groove 820 in an upper peripheral portion of the inner surface 806 of the housing 802 (see FIG. 8). The antenna cable 906 is provided between the LCD display 808 and the inner surface 806 of the housing 802 and serves to electrically couple the antenna 900 to the computing device.

Although not shown in FIGS. 8 and 9, after the antenna 900 is attached to the housing 802, a bezel (not shown) is then attached to the housing 802 to provide a front surface to the housing 802. The attachment of the bezel serves to complete the assembly of the housing 802. The attachment of the bezel can be facilitated by snaps 822 and 824 provided on the sides 816 and 818 respectively. In one implementation, the bezel is translucent and covers the cosmetic shield 810 as well as the more peripheral portions of the housing 802. In such an implementation, the antenna 900 together with the recesses 812 and 813, the groove 820 and the snaps 824 all provide a generally uniform design line within the housing. As such, even when the housing (at least the peripheral portion) is translucent, the antenna is largely unnoticeable to the untrained observer from the exterior of the housing.

While the above embodiments refer to the use of a dipole antenna, a monopole antenna or other antenna designs could also be used. While the recesses and grooves in the inner surface of the housing serves to provide uniform design features in a translucent housing, if a non-translucent housing were used, such recesses and grooves would not be as important. It should also be noted that to provide a sufficient separation gap 814, the sides 816 and 818 could be extended outward primarily only in the vicinity of the recesses 812 and 813 as opposed to the entire length of the sides 816 and 818.

Figures 10A, 10B:
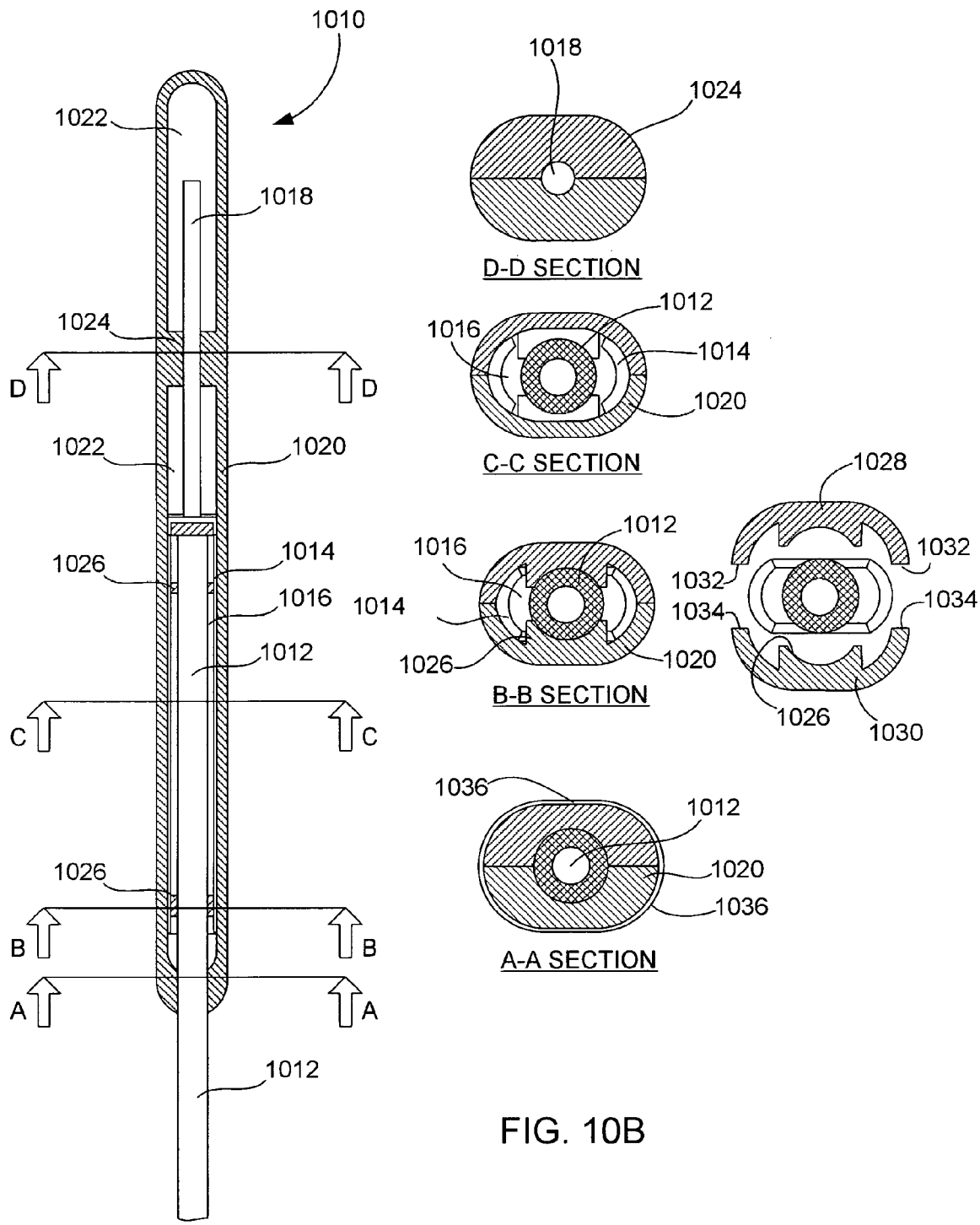
FIGS. 10A and 10B are cross-sectional drawings of a antenna pole according to one suitable embodiment.

The one or more antenna poles provided with the antenna can be formed in a variety of ways. FIGS. 10A and 10B are cross-sectional drawings of a antenna pole 1010 according to one suitable embodiment. The antenna pole 1010 couples to a cable 1012 (e.g., coaxial cable) that has an inner conductor and an outer conductor (not shown). A dielectric material (not shown) is disposed between the inner conductor and the outer conductor. The antenna pole 1010 is used to transmit and receive information with respect to a computing device associated with the antenna pole 1010. Typically, the cable has a distal end coupled to a portion of the antenna pole 1010 and a proximal end coupled to a circuit board or related device (e.g., transceiver) of the computing device. In one implementation, the cable 1012 is a coaxial cable. However, in general, the cable 1012 can be any suitable wiring having two conductors.

In the embodiment shown in FIGS. 10A and 10B, the antenna pole 1010 includes a first conductor 1014 that is operatively coupled to the outer conductor at the distal end of cable 1012. The first conductor 1014 flares back around the outer peripheral surface of the cable 1012. In this manner, a substantial portion of first conductor 1014 is disposed around the outer periphery of the cable 1012. In some situations, a gap 1016 is formed between the inner peripheral surface of the first conductor 1014 and the outer peripheral surface of the cable 1012 (as shown in the cross section C-C of FIG. 10B). In one implementation, the first conductor 1014 flares back about 23 mm in length, and the gap 1016 is 0.3 to 0.4 mm. Typically, the first conductor 1014 is formed from a conductive metal (e.g., copper). Also, as shown in FIGS. 10A and 10B, the first conductor 1014 may be configured in two separate sections that are both flared back on opposite sides of the outer periphery of the cable 1012.

The antenna pole 1010 also includes a second conductor 1018 that is operatively coupled to the inner conductor at the distal end of the cable 1012. The second conductor 1018 extends outward away from the distal end of the inner conductor of the cable 1012. In one implementation, the second conductor 1018 is preferably about 23 mm from the distal end of the inner conductor. Typically, the second conductor 1018 is formed from a conductive metal (e.g., copper). It should be noted that the first conductor 1014 and the second conductor 1018 may be integrally formed with the respective conductors of the cable 1010. In other words, the first conductor 1014 could be a portion of the outer conductor of the cable 1012, and the second conductor 1018 could be a portion of the inner conductor of the cable 1012.

The antenna pole 1010 has an antenna housing 1020 that is disposed around the first conductor 1014, the second conductor 1018, and a portion of the cable 1012. The antenna housing 1020 can be formed from a wide range of materials. By way of example, the antenna housing 1020 can be made of polycarbonate. In one implementation, the outer peripheral surface of first conductor 1014 is adjacent to the inner peripheral surface of the antenna housing 1020. Additionally, in one embodiment, there can be a space 1022 between the inner peripheral surface of the antenna housing 1020 and the outer peripheral surface of second conductor 1018. In such an embodiment having the space 1022, the antenna housing 1020 can also include a second conductor support member 1024 to support the second conductor (as shown in cross section D-D of FIG. 10B).

The antenna housing 1020 further includes a plurality of support members 1026 for supporting the cable 1012 line inside the antenna housing (as shown in cross section B-B of FIG. 10B). The supporting members 1026 can be separate pieces or integrally formed with the antenna housing 1020.

The antenna housing 1020 can be formed as a two-piece construction, including a first housing member 1028 and a second housing member 1030. In this case, the supporting members 1026 can be integrally formed with the first and second housing members 1028 and 1030. As shown, at the cross section B-B of FIG. 10B, the supporting members 1026 not only support the cable 1012 inside the antenna housing 1020 but also properly space the conductors 1014 apart from the cable 1020. With the two-piece construction, a first mating portion 1032 of the first housing member 1028 and a second mating portion 1034 of the second housing member 1030 are structurally coupled and held together with shrink tubing 1036 that surrounds a portion of the outer peripheral surface of the antenna housing 1020 (see cross section A-A of FIG. 10B).

There is an increasing trend in the computer industry, particular with respect to portable computers, to reduce size, weight and thickness. For the most part, any computer part that can be made smaller generally is made smaller to accommodate this need. By way of example, the wall thickness of the computer housing has been made thinner over the years. In most instances, decreased wall thickness reduces the overall thickness and weight of the computer, both of which are desired to make a portable computer more portable.

However, making the outer structure thinner to reduce computer weight and thickness has its drawbacks, typically the enclosure becomes more flexible. As a general rule, thicker walls mean stronger walls. Consequently, the thinner outer structure may not offer enough support to protect the internal components of the computer. Even when the thinner outer structure is strong enough to protect the internal components, users who expect rigid structures are unsatisfied.

Furthermore, recently, computer housing designs have become more decorative, thereby creating more complex shapes. These complex designs create structural problems that often result in even more flexible outer shells. Typically the complex shapes are contoured or curvilinear, which generally reduces the overall strength of the computer housing. The complex shapes also make it increasingly difficult to provide any internal support to offset these problems. For the most part, rectilinear designs, which include most of the computer housings on the market today, are stronger. The rectilinear design provides rigid support and is fairly easy to support with internal support members.

Figure 11A:
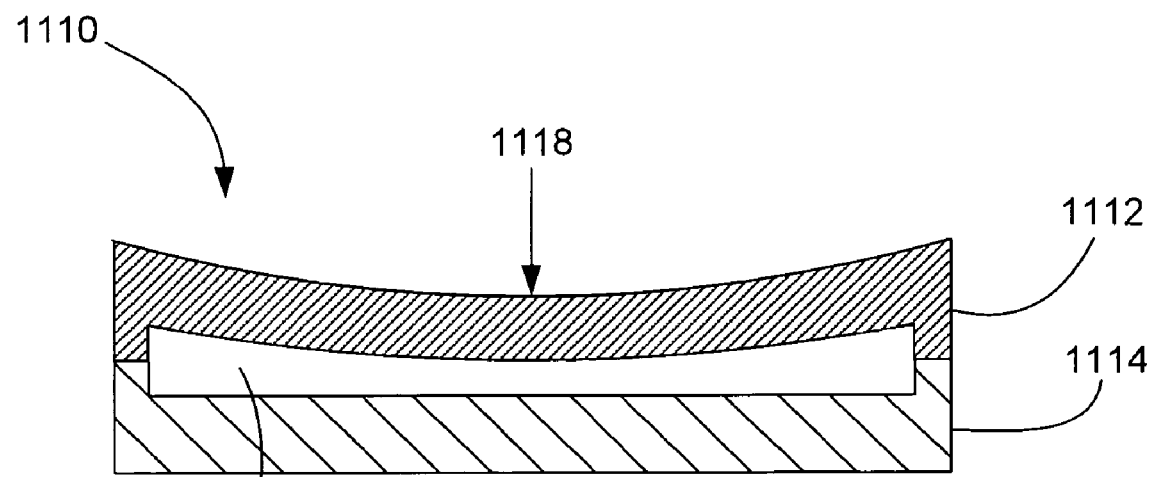
FIG. 11A is a cross-sectional diagram of a conventional computer housing exhibiting excessive amounts of flexibility.

FIG. 11A is a cross-sectional diagram of a conventional computer housing 1110 exhibiting excessive amounts of flexibility. The computer housing 1110 includes a top member 1112 and a bottom member 1114. Typically, the top member 1112 is structurally coupled to bottom member 1114 wherein an open space or volume 1116 is created therebetween. For the most part, this volume contains the different parts or components of a computer or display (e.g., circuit boards, key boards, display screen, etc.). Although, there are things contained in the volume, a significant portion of the volume is left unused. If a flexible (non-rigid) material is used to form the top member or bottom member, then the volume will be left structurally unsupported. By way of example, when a force 1118 is supplied to the computer housing 1110 (i.e., outer shell) at a position away from its members sides, the computer housing 1110 will deform under the force 1118, creating a "feel" ("squishy feel") which is considered by users indicative of low quality. As a result of the deforming, the force 1118 can also damage the internal parts or components of the computer or display (e.g., display screen).

In general, there are two ways to design a housing structure, one is to have a strong outer shell, the other is to have an internal skeleton structure. As a general rule, when the outer shell becomes increasingly thin (i.e., flexible) it is difficult to have a strong outer shell and therefore an internal support skeleton is usually provided to strengthen the thin outer shell. By way of example, ribs or inserts are typically used to increase the strength and rigidity of the outer shell.

Figure 11B:
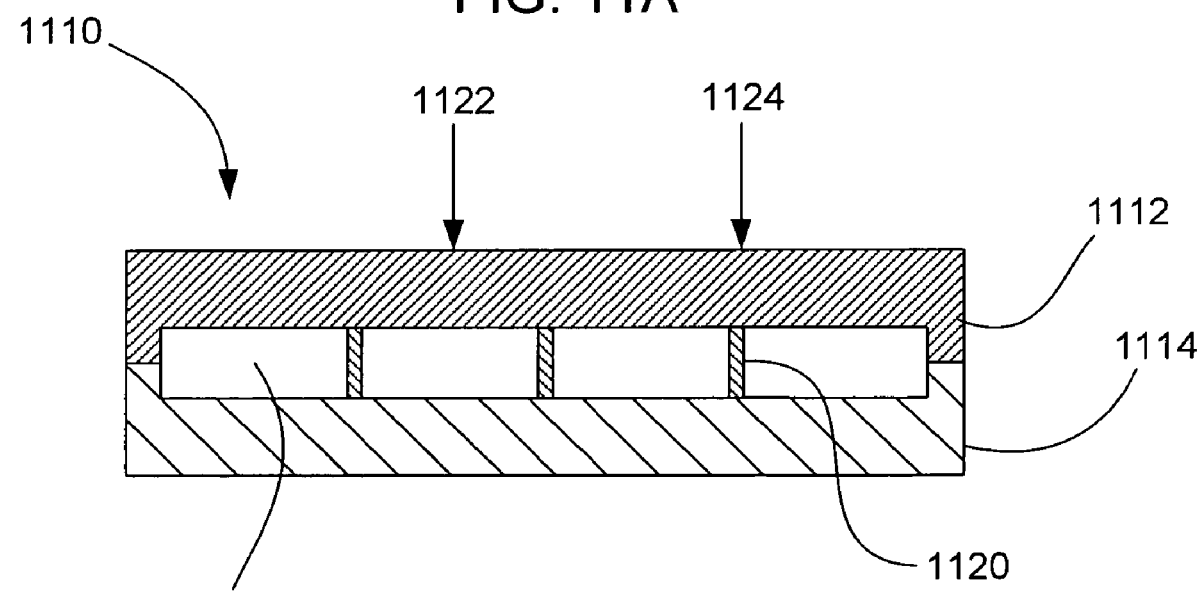
FIG. 11B is a cross-sectional diagram of the computer housing that includes a series of ridges (or inserts)

FIG. 11B is a cross-sectional diagram of the computer housing 1110 that includes a series of ridges 1120 (or inserts or ribs). Typically, the ridges 1120 provides support to both the bottom member 1114 and the top member 1112 of the computer housing 1110. The ridges 1120 may be configured as part of one of the members 1112, 1114 or may act as a separate piece. Although, the computer housing 1110 (outer shell) is better supported and has more rigidity, the volume 1116 created by the top member 1112 and the bottom member 1114 still includes unused space. Hence, if force 1122 is applied to the surface of the top member 1112, then the unsupported space will deform (i.e., flexible), albeit less than without the ribs 1120. If force 1124 is applied to the surface of the top member 1112 at the rib 1120, then the surface on the opposing side of the rib 1120 receives a large portion of the force 1124 which may damage sensitive parts. For example, if the bottom member 1114 were a LCD display screen, then the rib 1120 may transfer the full force of the force 1124 to the LCD display screen, which may damage the LCD display screen.

According to a fourth aspect of the invention, a computer housing with a stiffener is provided. The stiffener is configured to increase the rigidity and strength of the computer housing, which advantageously allows the thickness of the computer housing walls to be decreased. Thus, the use of the stiffener not only protects internal components but also provides a firmer feel to the housing. The stiffener can have a large surface area and be positioned between the top member and the bottom member of a housing to distribute external loads (e.g., pressures, forces) more evenly across the entire housing. More specifically, the stiffener can be configured to conform to the internal features of the housing that oppose (or are adjacent to) the stiffener, thereby maximizing the load distribution. That is, the stiffener advantageously fills the unused volume of the housing. Furthermore, the stiffener is configured to work in housings that have complex shapes (e.g., curvilinear) thereby allowing more decorative housings.

Accordingly, the stiffener provides a non-traditional solution to a load distribution problem. Typically, the computer industry has always used ribs, inserts, a thick outer shell and/or rectilinear shapes to support the computer housing. For the most part, the computer industry has not filled unused volumes within the computer housing because of the additional weight.

Figure 12:
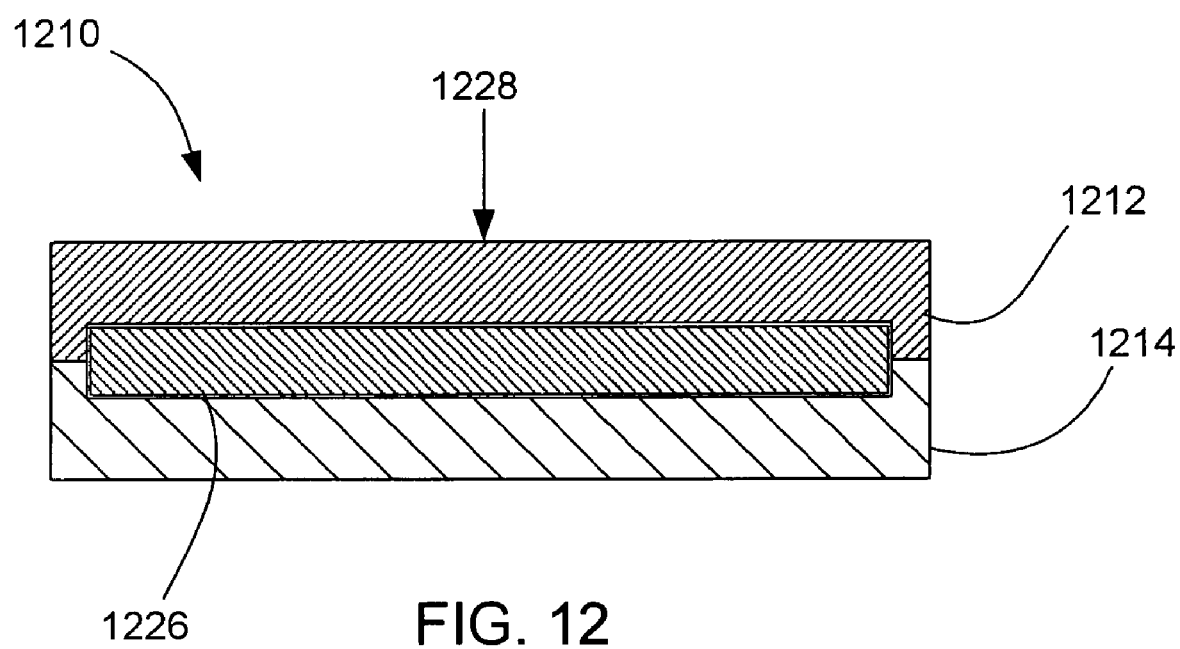
FIG. 12 is a diagram of a computer housing according to one embodiment of the invention.

FIG. 12 is a diagram of a computer housing 1210 according to one embodiment of the invention. The computer housing 1210 represents a housing used with a computing device such as a computer housing or cabinet or a display housing. The computer housing 1210 includes a first member 1212 and a second member 1214. Typically, the walls of each member 1212 and 1214 are thin and flexible. As mentioned above, the thin members 1212 and 1214 reduce the overall thickness and weight of the housing. The computer housing walls are typically formed from a plastic material such as polycarbonate (ABS). Normally, the first member 1212 is structurally coupled to the second member 1214 to form the outer shell of the housing 1210 and form a volume therein. Although the computer housing has been described as having a first and second members it should be noted that the computer housing may be integrally formed (e.g., one piece) or formed from a plurality of members (i.e., third member, fourth member, etc.).

Conventionally, the internal components or parts of the computer (e.g., printed circuit boards, LCD displays) are housed within the volume created within the housing 1210. However, in most situations, there remains a portion of the volume that is left unused (e.g., a void or open space). A stiffener 1226 is disposed within the housing 1210 to substantially fill any unused volume between the first and second members. Basically, the stiffener 1226 is configured to fill the unused volume (see FIG. 12). Moreover, the outer peripheral surface of the stiffener 1226 conforms to the shape of the adjacent components or inner peripheral surfaces of the first member and second member. The stiffener 1226 can be configured to provide clearance (or slots) for features such as connectors and wires. The stiffener 1226 can also include holes or openings (cavities) for internal components or parts. Additionally, the stiffener 1226 may include protrusions and depressions that coincide with the shape (geometry) of the components, parts or housing within the volume.

Because the stiffener 1226 fills the unused volume of the housing, forces that exerted on the outer peripheral surface of the housing are distributed over a larger surface area. Basically, if force 1228 is applied to the external surface of first member 1212, the single point of contact will be distributed throughout the stiffener 1226. In essence, the combination of the first member 1212, second member 1214, internal components and stiffener 1226 form a laminate structure that provides resistance to point pressure loading.

Furthermore, the stiffener 1226 may be fastened to at least one of the members or be tightly disposed between the members and components. In one implementation, the stiffener 1226 is fastened to the first member 1212 using a stiffener lip (not shown). Basically, the lip can be an extension of the first member and is configured to hold the stiffener 1226 in place. The lip may also be used as a locating ridge for determining the correct placement of the stiffener 1226 with respect to the first member. In another implementation, the stiffener 1226 may be structurally coupled to the first member or the second member using an adhesive. It still other implementations, other techniques can be used to hold the stiffener 1226 in place (e.g., screws, rivets, etc.).

Generally, the stiffener 1226 does not completely or overly fill the unused volume. Instead, a gap is provided so that the stiffener will not exert unwanted pressure on the surface of one of the components or the members while in a static condition. By way of example, if the first member is an LCD display screen, the static pressure exerted on the back side of the LCD display screen may damage the LCD display screen.

In one embodiment, the stiffener 1226 should be formed from a material that can substantially be implemented in a portable computer environment (low flammability, low static charge, low weight, and low compressibility). In a preferred embodiment of this invention, the stiffener is formed from foam. Advantageously, many foam materials fall within the above criteria, especially the weight. The foam may be machined, molded, or die cut to the desired shape. Preferably, packaging foam is used. As examples, the stiffener can be formed from polyurethane, expanded polystyrene, expanded polypropylene or expanded polyethylene. All of these examples are light weight, have compressible strength (substantially rigid) and are easily formed to different shapes. In any case, it should also be noted that the above description is not limiting and any material that is substantially rigid and lightweight (e.g., rubber, plastic, silicon) may be used.

Figure 13:
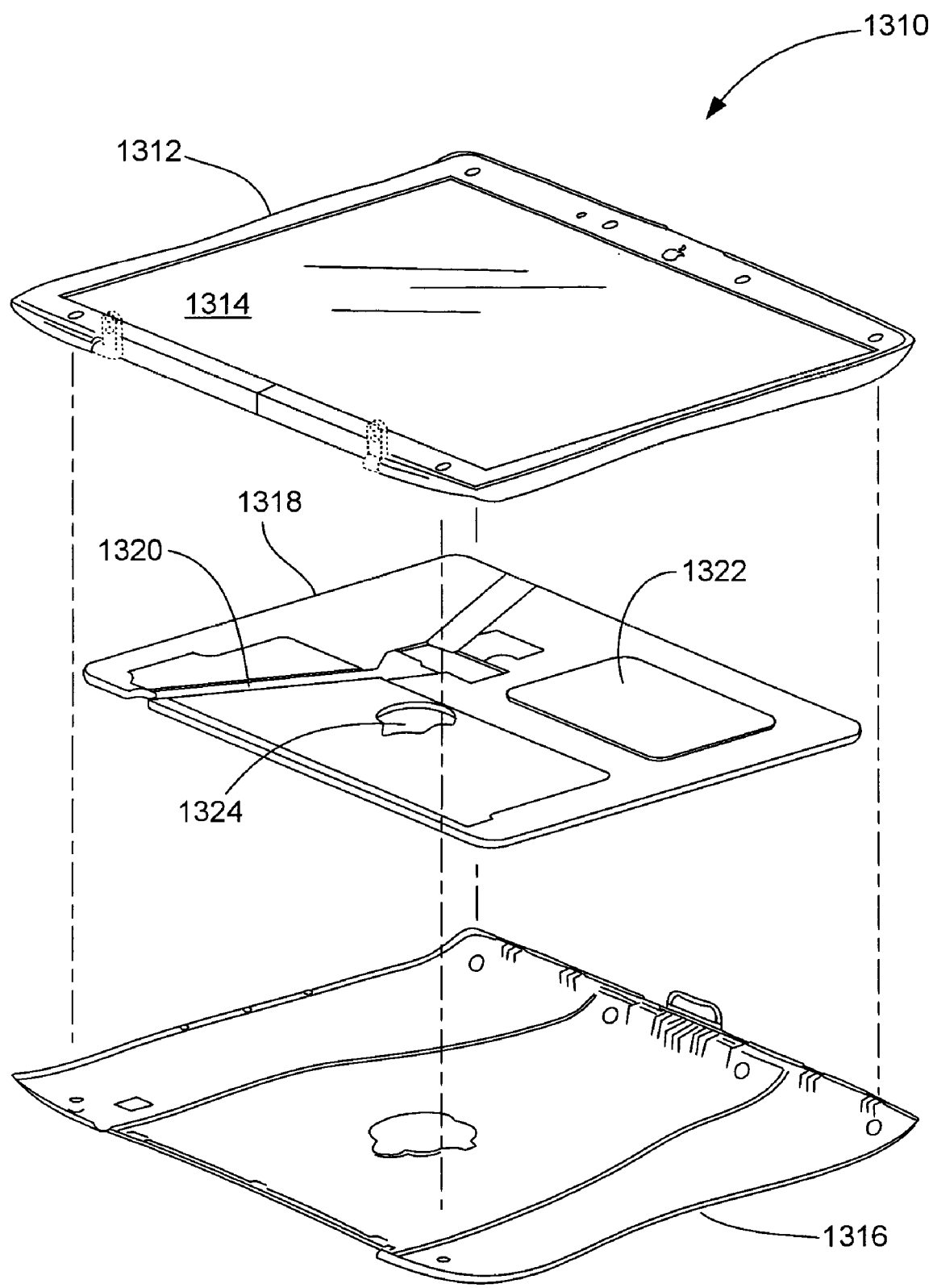
FIG. 13 is a broken perspective view of a LCD display screen housing according to one embodiment of the invention.

In another embodiment of the invention, lightweight stiffening is provided for a portable computer housing. In this particular embodiment, the computer housing is a LCD display screen housing. FIG. 13 is a broken perspective view of a LCD display screen housing 1310 according to one embodiment of the invention. The LCD display screen housing 1310 includes a bezel (frame) 1312 and an LCD display screen 1314 that form a front portion of the LCD display housing 1310. The LCD display screen housing 1310 further includes a back portion 1316 of the LCD display screen housing 1310. The back portion 1316 provides an impact resistant shell for protecting the backside of the LCD display screen 1314. As shown, both the bezel 1312 and the LCD display screen housing 1310 have complex shapes (internal and external) as well as portions that are curvilinear (e.g., decorative design).

A foam stiffener 18 is disposed between the front portion and the back portion 1316 of the LCD display screen housing 1316. Additionally, the outer peripheral surfaces of the foam stiffener 1318 are configured to conform the inner peripheral surfaces of the front portion (e.g., the LCD display screen 1314 and perhaps the bezel 1312) and the back portion 1316 of the LCD display screen housing 1316. Furthermore, the foam stiffener 1318 can also include a depression 1320 for disposing a connector and a protrusion 1322 that fits into the backside of LCD display screen 1314, and an opening 1324 for lighting a portion of the LCD display screen housing 1316. As shown, the foam stiffener 1318 is advantageously configured to fill the complex shapes associated with the bezel 1312, the LCD display screen 1314, the LCD display screen housing 1316 and connectors. It should be noted that the foam stiffener 1318 is not limited by any one of the above arrangements (e.g., depressions, protrusions, openings) and any combination thereof may be used. Moreover, all three structures (e.g., the front portion, the foam stiffener 1318 and the back portion 1316) form a laminate structure (when coupled together) for the LCD display screen housing 1310 that provides a rigid structure with a firm feel (not malleable or squishy) that is substantially resistant to point pressures.

In an alternate embodiment, the foam stiffener can be used as the entire computer housing and fabricated to fit all the parts and the components of the computer. To protect the outer peripheral surface of the foam, a coating can be applied over the outer surfaces to form a shell.

Although the foam stiffener 1318 has a one-piece construction, the foam stiffener 1318 can utilize multiple pieces. In another alternate embodiment, the foam may be injected into the housing to fill the unused volume between the front portion and the back portion.

In other embodiments, the foam stiffener can incorporate an antenna or an EMI shield. That is, an antenna or an EMI shield could be patterned onto or internal to the foam stiffener. In one implementation, the foam stiffener is primarily a foam as noted above but also could include copper and nickel to provide the antenna or the EMI shield.

Also, the foam stiffener is generally very light weight. Nevertheless to further reduce weight, the foam stiffener can include weight reducing apertures. These apertures (cavities or holes) are selected so as to reduce weight while maintaining rigidity. Such apertures may be patterned or randomly placed.

Furthermore, the foam stiffener provides for a firm feel to the computer housing assembly, which is particularly useful given the flexible nature of the increasingly thin-walled plastic products and the constraints of typical stiffening methods such as ribs or inserts. Increasingly thinner products means there is little room for ribs, while weight reduction efforts mean that traditional stiffening materials such as aluminum or mica are too heavy. The foam stiffener is very lightweight and can also be used to replace other functional and structural parts (sheet metal, plastics, etc.) and thus reduce cost, weight and parts count. The relatively soft nature of the foam stiffener acts as a load spreader which not only reduces likelihood of damaging parts or components internal to the housing, but also increases the units ability to survive point source pressures on the housing. In fact, in a ball pressure test for a portable computer, the display screen apparatus 1310 according to the invention passed the test, while a display screen apparatus without the benefits of the invention failed the test.

According to a fifth aspect of the invention, a logo, symbol or other device provided on a housing can be illuminated using light from the backside of a LCD panel. The light can be direct, reflected, or both. The illumination is provided by use of otherwise wasted light. The fourth aspect is similar to the first aspect but relies less on reflected light and is perhaps better suited for a non-translucent housing.

Figure 14A:
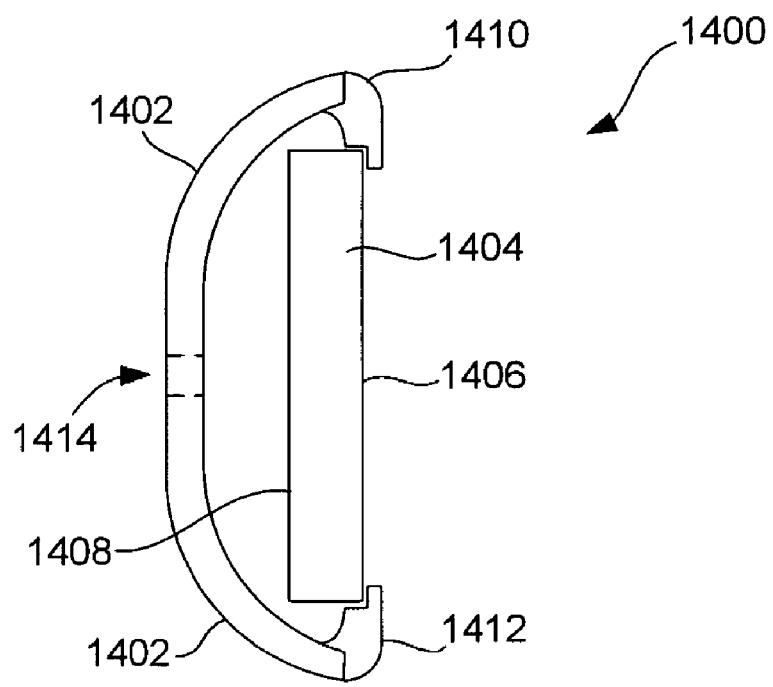
FIG. 14A is a cross-sectional diagram of a display apparatus according to one embodiment of the invention.

FIG. 14A is a cross-sectional diagram of a display apparatus 1400 according to one embodiment of the invention. The display apparatus 1400 includes a display housing 1400 that contains a LCD display 1404. The LCD display 1404 has a front surface 1406 and a back surface 1408. When the LCD display 1404 is power-on, the LCD display 1404 emits light primarily from the front surface 1406 but also emits some light from the back surface 1408. The fifth aspect of the invention serves to make use of the light emitted from the back surface 1408 that would otherwise go unused and thus wasted. The display apparatus 1400 also includes a bezel 1410 and 1412 to frame out the front surface 1406 of the LCD display 1404 and provide a smooth, uniform front surface for the display housing 1402.

The display housing 1402 also includes a translucent portion 1414 through which the light from the back surface 1408 of the LCD display 1404 can pass so as illuminate the translucent portion. In one embodiment, the display housing 1402 is generally opaque but includes the translucent portion 1414 where the light is desired. For example, a symbol, logo or other device can be provided at the translucent portion 1414 to be illuminated when the LCD display 1404 is powered-on. The translucent portion 1414 can be formed into the display housing 1402. Alternatively, an opening or hole can be provided in the display housing 1402 and a translucent plug or insert can be provided in the opening or hole.

Thus, the fifth aspect of the invention allow for the illumination of design elements or features. The fifth aspect of the invention also serves to provide a visual indication of whether the LCD panel is on. When a computer system utilizing the display apparatus 1400 enters a sleep mode, the LCD panel is typically power-off so that light is not emitted from the LCD display 1404 and thus the illumination of the design element or feature stops. A user is thereby informed that the computer system is in the sleep mode when there is no illumination of the design element or feature. Another advantage of the fifth aspect is that it requires very little space between the back surface 1408 and the inside surface of the display housing 1402. Still another advantage of the invention is that the illumination is provided without requiring any additional power because the light used is otherwise wasted.

The display housing 1400 shown in FIG. 14A has a curved cross-section for industrial design considerations, namely for better user appeal. However, the display housing 1400 can take a variety of different forms.

Figure 14B:
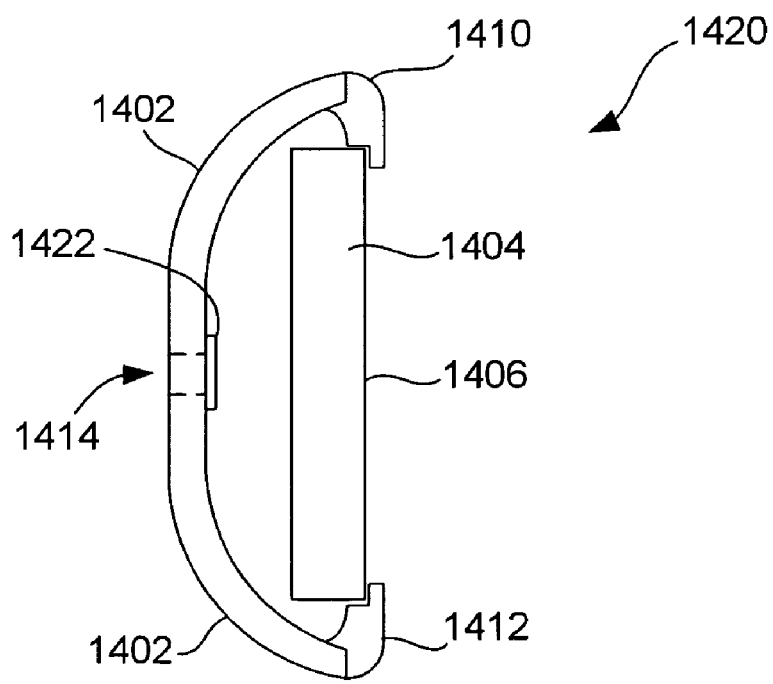
FIG. 14B is a cross-sectional diagram of a display apparatus according to one embodiment of the invention.

FIG. 14B is a cross-sectional diagram of a display apparatus 1420 according to one embodiment of the invention. Although the display apparatus 1420 is similar to the display apparatus 1400 of FIG. 14A, the display apparatus 1420 includes a light diffuser 1422. As shown in FIG. 14B, the light diffuser 1422 is provided on an inner surface of the display housing 1402 at the translucent portion 1414. More generally, the light diffuser 1422 can be provided any where between the back side 1408 of the LCD display 1404 and the outer surface of the housing display 1402 at the translucent portion 1414.

The light diffuser 1422 operates to enable control of intensity and color of the illumination at the translucent portion 1414. In one embodiment, the light diffuser 1422 is a label. The light diffuser 1422 can have a graphic printed thereon, can have multiple colors, and can use varying thickness all to assist with the control over the intensity and color of the illumination provided. For example, the material for the light diffuser 1422 can be general label stock, Mylar, Lexan (from General Electric) or any other material that is thin and translucent. Particular graphics or color shades can be printed on the light diffuser 1422 if desired.

The ability to control the light intensity of the illumination is useful to normalize the illumination yielded by difference vendors of the LCD displays. For example, in a LCD display from a first vendor emits light at a first intensity from its back surface and a LCD display from a second vendor emits light at a second intensity (which is greater than the first intensity) from its back side, then the illuminated logo, symbol or device would appear brighter in the display housing using the LCD display from the second vendor. Hence, the light diffuser 1422 can be used to normalize the intensity of the illumination provided. For example, the thickness of the light diffuser 1422 (label) used with the display housing using the LCD display from the second vendor can be increased (as compared to the thickness used with the display housing using the LCD display from the first vendor) to thus reduce its translucency.

Figure 14C:
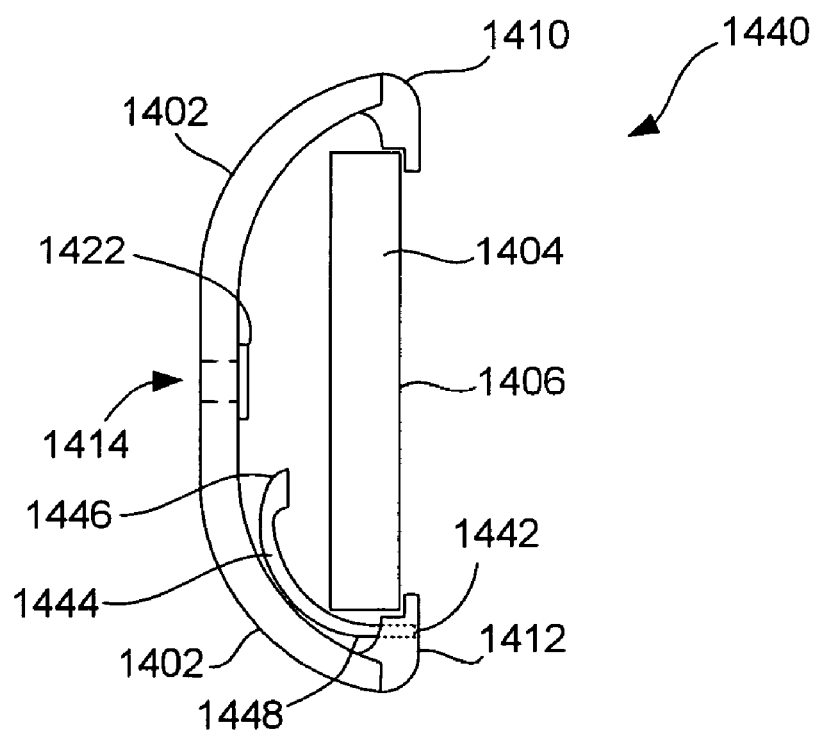
FIG. 14C is a cross-sectional diagram of a display apparatus according to one embodiment of the invention.

FIG. 14C is a cross-sectional diagram of a display apparatus 1440 according to one embodiment of the invention. Although the display apparatus 1440 is similar to the display apparatus 1420 of FIG. 14B, the display apparatus 1440 further includes an illuminated area 1442 in the bezel 1412 and a light guide 1444. As shown in FIG. 14B, the light guide 1444 has a first end 1446 that receives a portion of the light emitted from the back surface 1048 of the LCD display 1404. The light received by the first end 1446 is then directed through the light guide 1444 and output at a second end 1448. The second ends 1448 is coupled to the illuminated area 1442 so that the light directed through the light guide 1444 is coupled to the illuminated area 1442, thereby illuminating the illuminated area 1442.

Figure 14D:
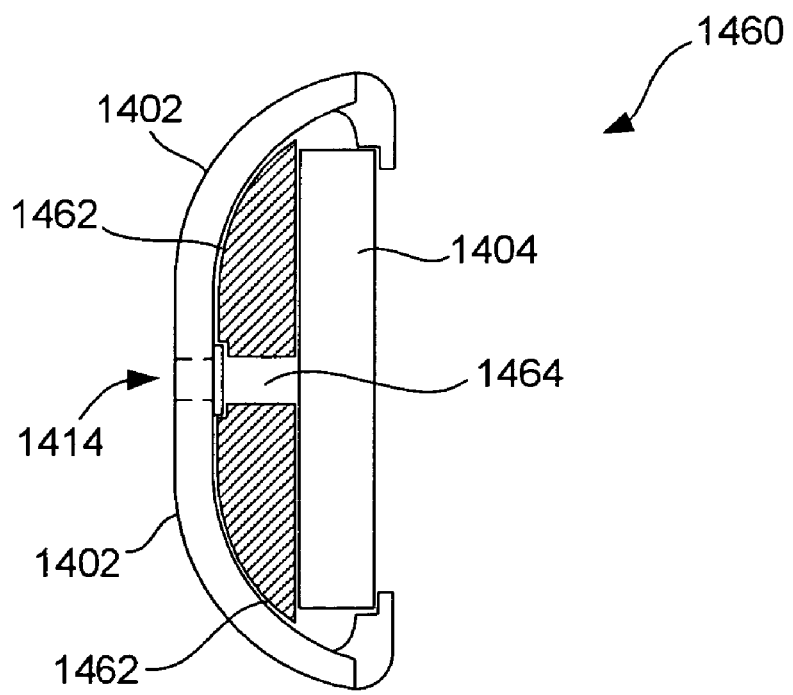
FIG. 14D is a cross-sectional diagram of a display apparatus according to one embodiment of the invention.

FIG. 14D is a cross-sectional diagram of a display apparatus 1460 according to one embodiment of the invention. Although the display apparatus 1460 is similar to the display apparatus 1420 of FIG. 14B, the display apparatus 1460 further includes a foam insert 1462 to stiffen the display apparatus 1460. The foam insert 1462 conforms to the space between the back surface 1408 of the LCD display 1404 and the inner surface of the display housing 1402. In one embodiment, the foam insert 1462 is a piece of foam such as discussed above with respect to the fourth aspect of the invention. As shown in FIG. 14D, to permit a portion of the light emitted from the back surface 1408 from reaching the light diffuser 1422 as well as the translucent portion 1414, the foam insert 1462 includes an opening 1464. The opening 1464 provides a light path from the back surface 1408 of the LCD display 1408 and the translucent portion 1414 of the display housing 1402.

According to a sixth aspect of the invention, a lid for a computing device, such as a portable computer, is provided with a translucent housing yet offers an appealing aesthetic look without being hampered by components internal to the housing. Aesthetic appearance can be improved by using cosmetic shields.

The invention claimed is:
1. A computer system, comprising:
an antenna, said antenna being a dipole antenna configured to transmit or receive RF signals, said antenna including first and second poles and an antenna cable; and a display housing that houses a display screen, said display housing being configured to enclose said antenna such that said antenna is entirely contained internal to said display housing and is operable while being internal to said display housing without having to extend any portion of said antenna outside said display housing, said display housing having a first recess positioned in an inner surface of and within the display housing and peripherally to a first side of the display screen, a second recess positioned in the inner surface of and within the display housing and peripherally to a second side of the display screen diametrically opposite the first side of the display screen, and a groove positioned in an upper peripheral portion of the inner surface, wherein the first pole is received and secured within said first recess, the second pole is received and secured within said second recess, and the antenna cable is received and secured within said groove.

2. A computer system as recited in claim 1, wherein the first and second recesses are separated from said display screen by at least a predetermined amount.

3. A computer system as recited in claim 1, wherein the first and second antenna poles are separated from any metal surfaces within said display housing by at least a predetermined amount.

4. A computer system as recited in claim 1, wherein the first and second antenna poles are substantially invisible external to said display housing.

5. A computer system as recited in claim 1, wherein said computer system is a portable computing device.

6. The computer system as recited in claim 1, further comprising a groove along said peripheral region of said display housing, said groove being arranged to receive a significant portion of an antenna cable that couples said first and second poles.

7. The computer system as recited in claim 1, wherein the display housing is an LCD display housing that encloses an LCD panel.

8. The computer system as recited in claim 1, wherein the display housing is a lid of a portable computer that includes an LCD panel therein.

9. A computer system comprising:
an antenna, said antenna being configured to transmit or receive RF signals, said antenna including first and second poles;
a display housing that houses a display screen, said display housing being configured to enclose said antenna such that said antenna is entirely contained internal to said display housing and is operable while being internal to said display housing without having to extend any portion of said antenna outside said display housing, said display housing having a first recess positioned peripherally to a first side of the display screen and a second recess positioned peripherally to a second side of the display screen opposite the first side of the display screen, wherein the first pole is received and secured by said first recess and the second pole is received and secured by said second recess;
an antenna cable having first and second conductors and wherein each of said first and second poles includes:
an outer conductor, said outer conductor being operatively coupled to said second conductor of said antenna cable;
an inner conductor, said inner conductor being operatively coupled to said first conductor of said antenna cable; and
an antenna housing separate from said display housing, said antenna housing being disposed around the outer periphery of said outer conductor and said inner conductor, and wherein said antenna housing maintains a fixed separation between said outer conductor and said antenna cable.

10. An antenna device for transmitting and receiving RF signals for use by a computer, said antenna device comprising:
an antenna cable having first and second conductors; and
at least one antenna pole, said at least one antenna pole including:
an outer conductor, said outer conductor being operatively coupled to said second conductor of said antenna cable, said outer conductor flaring back and around an outer peripheral surface of said antenna cable, an inner surface of said outer conductor being separated from an outer surface of said antenna cable;
an inner conductor, said inner conductor being operatively coupled to said first conductor of said antenna cable, said inner conductor extending from a distal end of said first conductor of said antenna cable; and
an antenna housing, said antenna housing being disposed around the outer periphery of said outer conductor and said inner conductor and a portion of said antenna cable, wherein an outer surface of said outer conductor is arcuate and substantially conforms to an inner surface of said antenna housing, and wherein said antenna housing maintains a fixed separation between said outer conductor and said antenna cable.

11. An antenna device as recited in claim 10, wherein said antenna housing is formed from polycarbonate.

12. An antenna device as recited in claim 10, wherein said outer conductor is formed from copper.

13. An antenna device as recited in claim 10, wherein said antenna cable is a coaxial cable.

14. An antenna device as recited in claim 10, wherein an outer peripheral surface of said antenna housing is surrounded by shrink tubing.

15. The antenna device as recited in claim 10, wherein the antenna device includes a first pole and a second pole.

16. The antenna device as recited in claim 10, wherein said outer conductor is integrally formed with said second conductor of said antenna cable.

17. The antenna device as recited in claim 10, wherein said inner conductor is integrally formed with said first conductor of said antenna cable.

18. The antenna device as recited in claim 10, wherein said outer conductor is substantially concentric with said antenna cable.

19. The antenna device as recited in claim 10, further comprising a space between an outer surface of said inner conductor and said inner surface of said antenna housing.

20. The antenna device as recited in claim 19, further comprising an inner conductor support member that directly supports at least a portion of said inner conductor within said space.

21. The antenna device as recited in claim 20, wherein said inner conductor support member is integrally formed with said antenna housing.

22. The antenna device as recited in claim 10, wherein said antenna housing includes a plurality of cable support members that are integrally formed with said antenna housing, the cable support members being arranged to support the antenna cable.

23. The antenna device as recited in claim 22, wherein the plurality of cable support members are further arranged to maintain the separation between said outer conductor and said antenna cable.

24. An antenna device for transmitting and receiving RF signals for use by a computer, said antenna device comprising:
- an antenna cable having first and second conductors; and
- at least one antenna pole, said at least one antenna pole including:
  - an outer conductor, said outer conductor being operatively coupled to said second conductor of said antenna cable, said outer conductor flaring back and around an outer peripheral surface of said antenna cable, an inner surface of said outer conductor being separated from an outer surface of said antenna cable;
  - an inner conductor, said inner conductor being operatively coupled to said first conductor of said antenna cable, said inner conductor extending from a distal end of said first conductor of said antenna cable; and
  - an antenna housing, said antenna housing being disposed around the outer periphery of said outer conductor and said inner conductor and a portion of said antenna cable, wherein an outer surface of said outer conductor is arcuate and substantially conforms to an inner surface of said antenna housing, wherein said antenna housing maintains a fixed separation between said outer conductor and said antenna cable, and wherein said outer conductor is divided into two distinct portions that extend back along said antenna cable on substantially opposite sides of said antenna cable.

25. The antenna device as recited in claim 24, wherein the two distinct portions of the arcuate outer conductor together are substantially concentric with said antenna cable.

26. An antenna device for transmitting and receiving RF signals for use by a computer, said antenna device comprising:
- an antenna cable having first and second conductors; and
- at least one antenna pole, said at least one antenna pole including:
  - an outer conductor, said outer conductor being operatively coupled to said second conductor of said antenna cable, said outer conductor flaring back and around an outer peripheral surface of said antenna cable, an inner surface of said outer conductor being separated from an outer surface of said antenna cable;
  - an inner conductor, said inner conductor being operatively coupled to said first conductor of said antenna cable, said inner conductor extending from a distal end of said first conductor of said antenna cable; and
  - an antenna housing, said antenna housing being disposed around the outer periphery of said outer conductor and said inner conductor and a portion of said antenna cable, wherein an outer surface of said outer conductor is arcuate and substantially conforms to an inner surface of said antenna housing, wherein said antenna housing maintains a fixed separation between said outer conductor and said antenna cable, and wherein the antenna housing includes a first housing member and a second housing member and wherein a first mating portion of said first housing member and a second mating portion of said second housing member are structurally coupled and supported by shrink tubing that surrounds a portion of an outer peripheral surface of said antenna housing.

27. A computer system, comprising:
- an RF antenna system including a coaxial antenna cable, an antenna pole and an antenna housing, the antenna pole including an inner conductor and an outer conductor, wherein
  - the inner conductor of the antenna pole extends distally from a distal end of a first conductor of the coaxial cable and is supported by the antenna housing,
  - the outer conductor of the antenna pole extends proximally from the distal end of the second conductor of the coaxial cable and is supported by the antenna housing spaced apart from the coaxial cable,
  - the antenna housing includes cable support members that support the coaxial cable and maintain the spacing between the outer conductor and the coaxial cable, and at least one inner conductor support member that supports the inner conductor, and
- a display housing that houses a display screen, the display housing being configured to enclose the antenna system, the antenna pole and portions of the antenna cable being arranged peripherally of the display screen, the display housing including a recess arranged to receive the portion of the antenna housing surrounding the antenna pole.

* * * * *